US011378927B2

(12) United States Patent
Guan et al.

(10) Patent No.: US 11,378,927 B2
(45) Date of Patent: Jul. 5, 2022

(54) HOTEL MANAGEMENT SYSTEM

(71) Applicant: QIXINGTIAN (BEIJING) CONSULTING COMPANY LTD., Beijing (CN)

(72) Inventors: Shan Guan, Fremont, CA (US); Tao Zhao, Shanghai (CN)

(73) Assignee: QIXINGTIAN (BEIJING) CONSULTING COMPANY LTD., Beijing (CN)

( * ) Notice: Subject to any disclaimer, the term of this patent is extended or adjusted under 35 U.S.C. 154(b) by 207 days.

(21) Appl. No.: 16/713,193

(22) Filed: Dec. 13, 2019

(65) Prior Publication Data
US 2020/0117156 A1 Apr. 16, 2020

Related U.S. Application Data

(63) Continuation of application No. PCT/CN2017/088939, filed on Jun. 19, 2017.

(51) Int. Cl.
*G05B 19/048* (2006.01)
*G06Q 50/12* (2012.01)
(Continued)

(52) U.S. Cl.
CPC .......... *G05B 19/048* (2013.01); *G06Q 50/12* (2013.01); *G07C 9/00904* (2013.01); *H04L 12/2834* (2013.01)

(58) Field of Classification Search
CPC .. G05B 19/048; G06Q 50/12; G07C 9/00904; H04L 12/2834
See application file for complete search history.

(56) References Cited

U.S. PATENT DOCUMENTS

| 2003/0149576 A1* | 8/2003 | Sunyich ................. G06Q 10/02 705/5 |
| 2017/0116561 A1* | 4/2017 | Saddler .......... G06Q 10/063116 |
| 2017/0147016 A1* | 5/2017 | Lingineni .......... H04L 12/2816 |

FOREIGN PATENT DOCUMENTS

| CN | 203732975 U | 7/2014 |
| CN | 204904000 U | 12/2015 |

(Continued)

OTHER PUBLICATIONS

International Search Report in PCT/CN2017/088939 dated Mar. 15, 2018, 7 pages.

(Continued)

*Primary Examiner* — Thomas C Lee
*Assistant Examiner* — Charles Cai
(74) *Attorney, Agent, or Firm* — Metis IP LLC

(57) ABSTRACT

The present application provides a hotel management system and method. The system includes at least one control panel; the control panel includes a first sub-panel and a second sub-panel; the first sub-panel is used to verify a first authorization key; and the first authorization key is used for hotel identity verification; the second sub-panel works independently of the first sub-panel, and the second sub-panel includes at least one physical regulator. The physical regulator is used to control sensing module and room equipment; and the first sub-panel controls the physical regulator. The first sub-panel and the second sub-panel are detachably connected. The hotel management system and guests can interact with each other and a smarter, more convenient and more powerful hotel environment control system is integrated in the hotel management system.

12 Claims, 11 Drawing Sheets

(51) Int. Cl.
*G07C 9/00* (2020.01)
*H04L 12/28* (2006.01)

(56) References Cited

FOREIGN PATENT DOCUMENTS

| CN | 106373041 A | 2/2017 |
| CN | 106707993 A | 5/2017 |

OTHER PUBLICATIONS

Written Opinion in PCT/CN2017/088939 dated Mar. 15, 2018, 8 pages.

\* cited by examiner

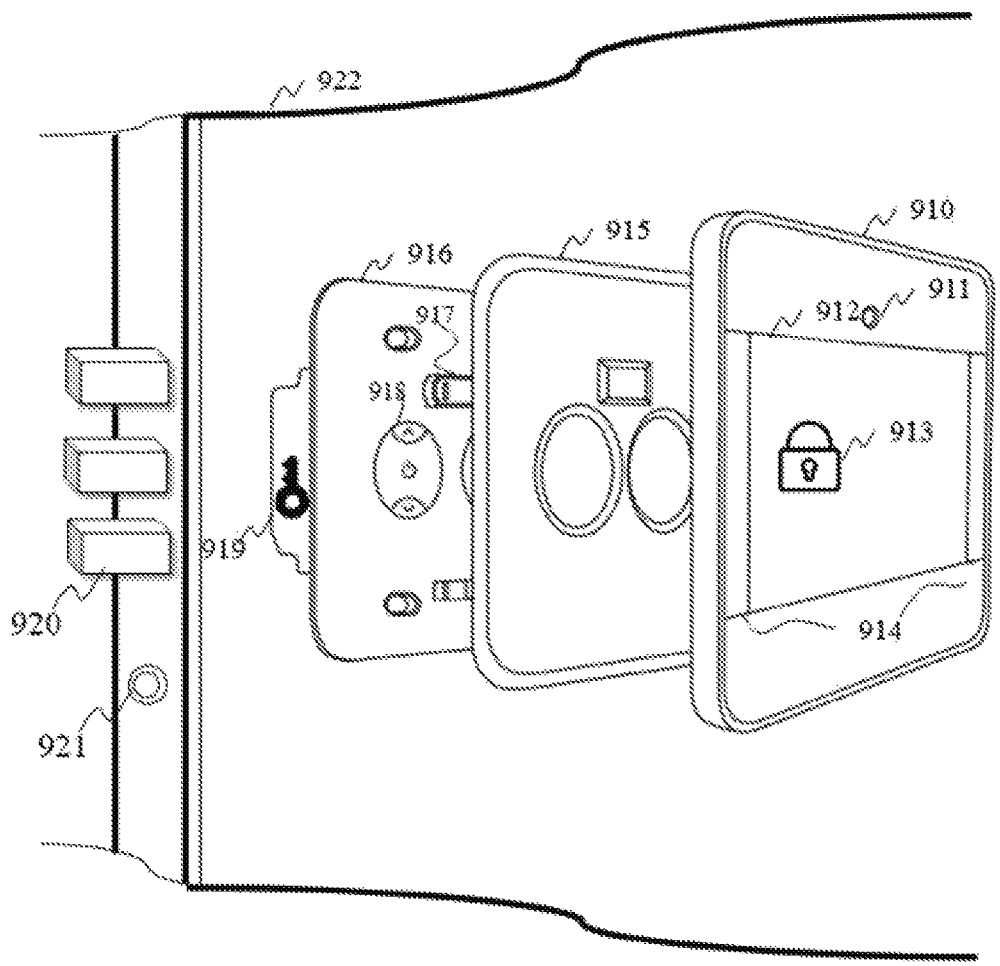
FIG. 9-A

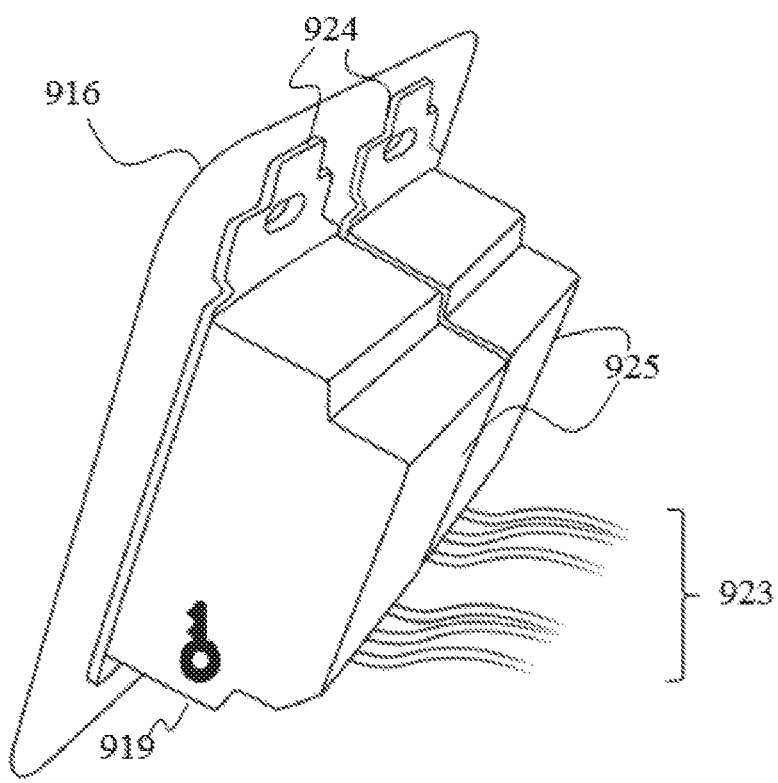
FIG. 9-B

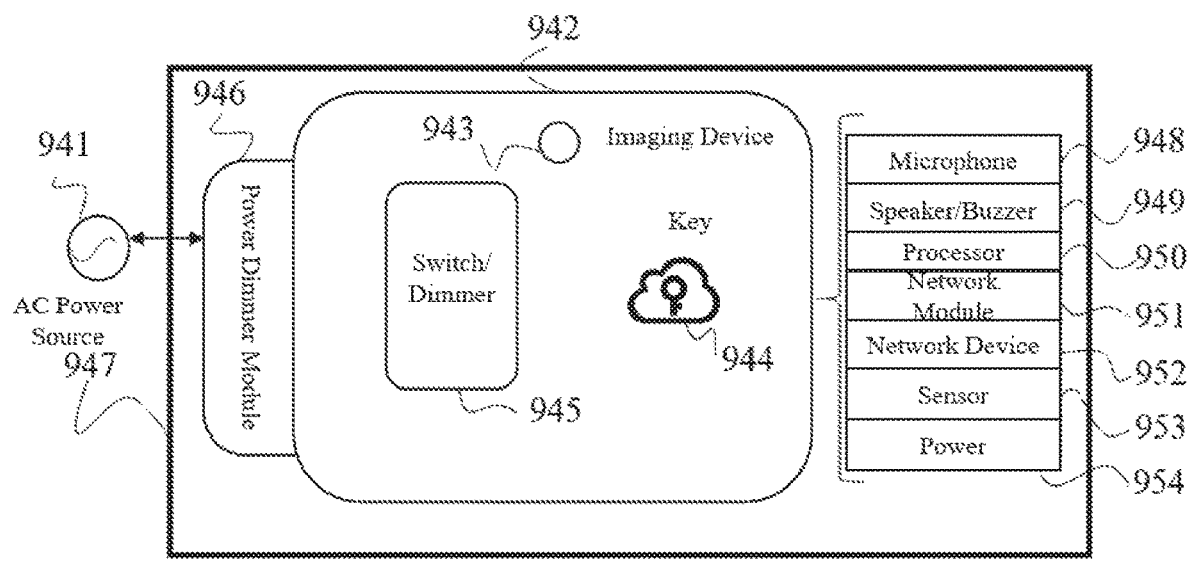
FIG. 9-C

HOTEL MANAGEMENT SYSTEM

CROSS-REFERENCE TO RELATED APPLICATIONS

The present application is a Continuation of International Application No. PCT/CN2017/088939 filed on Jun. 19, 2017, the entire contents of which are incorporated herein by reference in entirety.

TECHNICAL FIELD

This present disclosure relates to the field of intelligence science of hotel management systems. In particular, it relates to a full-automatic hotel management system.

BACKGROUND

Living environment of the modern society often relies on the cooperation of various electronic devices. It is more and more important to use the various electronic devices to enhance hotel services and management in the information age. After years of development, the hotel management system has matured and been increasingly perfected. With rapid development of information technology, hotels have put forward higher requirements for intelligent management. Backstage center in existing hotel management systems is used to control equipment in a hotel room such as room doors, door locks, lighting equipment, heating and air-conditioning systems, and common electrical appliances and so on, or users may directly operate the room equipment and upload related information to the backstage center. The existing hotel management systems and users cannot interact with each other, so a more intelligent, more convenient and more powerful full-automatic hotel management system is needed.

SUMMARY

According to a first aspect of the present application, a hotel management system is provided. The hotel management system may include at least one control panel; and the control panel may include a first sub-panel and a second sub-panel. The first sub-panel may be used to verify a first authorization key, and the first authorization key may be used for hotel check-in authentication. The second sub-panel may work independently of the first sub-panel, the second sub-panel may include at least one physical regulator to control sensing module and room equipment. The first sub-panel may control the physical regulator, and the first sub-panel and the second sub-panel are detachably connected.

Optionally, the first authorization key further may be used for at least one of room check-in management, push service, control of the room environment, and execution of check-out management.

Optionally, the first sub-panel further includes a second authorization key, and the second authorization key may be used for at least one of room check-in management, push service, control of the room environment, and room check-out management.

Optionally, the first sub-panel further includes a third authorization key, and the third authorization key may be used for a third-party room check-in management.

Optionally, the control panel further includes a key capsule for keeping keys and mechanically opening the control panel.

Optionally, the key capsule may be installed in the second sub-panel.

Optionally, the physical regulator further includes a physical dimmer.

Optionally, the physical regulator further includes a physical thermostat.

BRIEF DESCRIPTION OF THE DRAWINGS

In order to better illustrate technical solutions related to some embodiments of the present disclosure, drawings associated with some embodiments are briefly described below. Obviously, drawings described below are only several embodiments of the present disclosure. A person of ordinary skill in the art, without further creative effort, may apply the present teachings to other scenarios according to the drawings. Unless specified or obviously indicated by the context, same numberings in the drawings refer to same structures or procedures.

FIG. 9-A is an exemplary schematic diagram illustrating an exemplary structure of the control panel according to some embodiments of the present disclosure;

FIG. 9-B is a schematic diagram of one embodiment of a hotel management system shown according to some embodiments of the present disclosure;

FIG. 9-C is a schematic diagram of one embodiment of a hotel management system shown according to some embodiments of the present disclosure.

DETAILED DESCRIPTION

According to the specifications and claims in the present disclosure, unless otherwise specified in the context, articles such as "a," "an," and/or "the" do not necessarily indicate singular forms, and also include plural forms. Generally, expressions such as "include" and "comprise" are only used to indicate specified steps or elements. However, listings of these steps and elements are not exclusive, and methods or device may also include other steps or elements.

Although the present disclosure makes various references to certain modules/units in a hotel environment control system according to embodiments of the present disclosure, any number of different modules/units may be used and run on a remote terminal and/or server connected to the hotel environment control system over a network. The modules/units are merely illustrative, and different aspects of the systems and methods may use different modules/units.

The present disclosure illustrates the operation steps implemented by a hotel environment control system with flow charts according to an embodiment of the present disclosure. It should be understood that the steps shown before or after are not necessarily implemented accurately in the order. Instead, various steps may be processed in reverse order or simultaneously. At the same time, other steps also may be add to these processes, or remove one or more steps from these processes.

Figure 1:
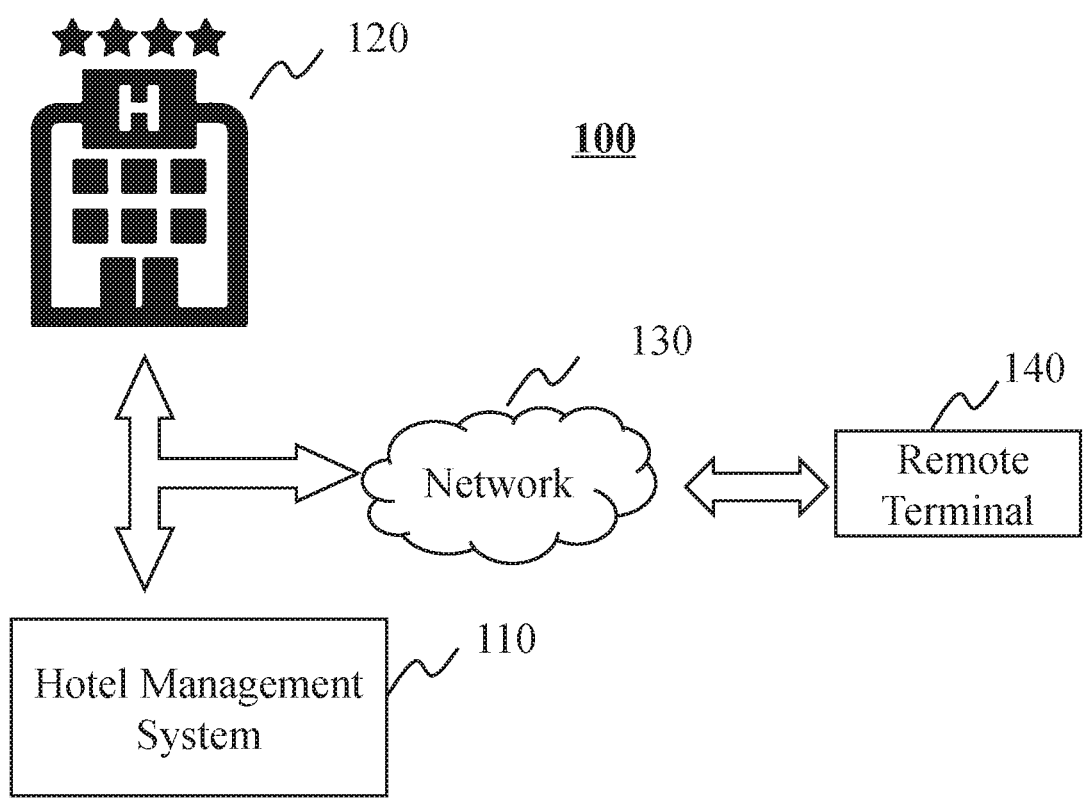
FIG. 1 is a schematic diagram illustrating an exemplary a hotel service system according to some embodiments of the present disclosure.

FIG. 1 is a schematic diagram illustrating an exemplary a hotel service system according to some embodiments of the present disclosure. The hotel service system 100 may include but not limited to a hotel management system 110, a hotel 120, a network 130, and a remote terminal 140. In some embodiments, the hotel service system 100 may be physically presented in the hotel 120 or remotely communicate with the hotel 120 via wireless communication (e.g., a cloud computing platform) or a wire communication (e.g., a cable broadband network.) In some embodiments, hotel service system 100 may be applied to one or more hotels. In some embodiments, the hotel 120 may be applied with one or more hotel service systems 100. For example, the hotel service system 100 may include at least one or more hotels 120, and data communication between the one or more hotels may be wireless which is liberated from geographical restriction.

In some embodiments, the hotel management system 110, the hotel 120, and the remote terminal 140 may be directly connected to each other or may be indirectly connected to each other. In some embodiments, the hotel management system 110, the hotel 120, and the remote terminal 140 may be directly and/or indirectly connected to each other via the network 130. In some embodiments, the hotel management system 110, the hotel 120, and the remote terminal 140 may be indirectly connected through one or more intermediate units (not shown in the figure). The intermediate unit may be physical or non-physical (for example, a combination of one or more of radio waves, optical waves, sonic waves, electromagnetic waves, or the like, or any combination thereof). Different modules and units may be connected by a wire or wirelessly.

The hotel management system 110 may be configured to collect hotel data. The hotel data may include but not limited to current check-in status information and reservation status information of each hotel room, room types, prices of different room types, bed types, room facilities, hotel facilities, user evaluation information, traffic information, or the like, or any combination thereof. The room types may include a single room, a double room, a dormitory room, a suite room, smoking or non-smoking rooms. The bed types may include a single bed, a small double beds, double beds, a full size bed, a queen size bed, a king size bed, or the like, or any combination thereof. The room facilities may include a bedroom, a living room, a studio, a bathroom, a kitchen room, an electronic map of the hotel (e.g., an electronic may which may indicate an entrance and an exit of a parking lot, locations of emergency exit, a breakfast location, a rally point of free shuttle service, or the like, or any combination thereof.) The hotel facilities may include but not limited to a parking lot, a swimming pool, a garden, a fitness center, a beauty salon, a front desk, a business center, cleaning, dining, a vending machine, an ice machine, an ATM, a souvenir shop, a convenience shop, a free shuttle, or the like, or any combination thereof. The user evaluation information may include users' satisfaction evaluation, users' complaints and suggestions. The traffic information may include a location of the hotel facilities, a location of a geographical point of interest near the hotel, a user's current location, or the like, or any combination thereof. An optimized route between the user's current location and the location of the hotel facilities or the location of a geographical point of interest near the hotel may be determined and displayed to the user.

It should be noted that the hotel management system 110 may actually exist in the hotel 120 or remotely communicate with the hotel 120 through a cloud computing platform. The cloud computing platform may include but not limited to a storage cloud platform mainly for storing data, a computing cloud platform mainly for processing data, and an integrated cloud computing platform capable of storing and processing data. The cloud platform used by the hotel management system 110 may be a public cloud, a private cloud, a community cloud, a hybrid cloud, a distributed cloud, an inter-cloud, a multi-cloud, or the like, or any combination thereof. For example, according to an actual demand, some of the data outputted by the hotel management system 110 may be processed and/or stored by the user cloud platform, and may also be processed and/or stored by the local computer device.

The hotel 120 may be one or more buildings distributed in one or more areas (e.g., multiple hotels within a single area). The hotel 120 may include but not limited to one or more business hotels, resort hotels, themed hotels, resident hotels, conference hotels, tourist hotels, budget hotels, hotel chains, apartment hotels, serviced apartments, and guesthouses, or the like, or any combination thereof. The hotel 120 may include one or more separate rooms, which may be multiple room types, such as one or more combinations of single rooms, double rooms, and multiple rooms.

The network 130 may be a single network, or a combination of multiple different networks. For example, the network 130 may be a combination of one or more of local area network (LAN), wide area network (WAN), public network, private network, private network, public switched telephone network (PSTN), internet, wireless network, virtual network, metropolitan-area network, telephone network, and the like. The network 130 may include multiple network access points such as wired or wireless access points like wired access points, wireless access points, base stations, internet exchange points, or the like, or any combination thereof. The data source may access the network 130 and send data information over the network 130 through these access points. The examples mentioned above are just for the convenience of illustration, while the network may further include other aspect. For example, the network 130 of the hotel management system 110 may include wireless networks (e.g., Bluetooth, wireless local area network (WLAN, Wi-Fi, WiMAX, etc.), mobile networks (e.g., 2G, 3G, 4G signals, etc.), or other connection modes (e.g., virtual private network, VPN, etc.), shared network, near field communication (e.g., NFC, ZigBee, etc.) In some embodiments, the network 130 may be configured for inter communication between the hotel service system 100, or the network 130 may be configured for the external communication of multiple hotel service systems 100, or the network 130 may be configured to receive information from the hotel management system 110, or the network 130 may be configured for communication between several different hotels, or the network 130 may be configured for communication between different rooms, or the network 130 may be configured to send information to outside of the hotel service system 100. For a person of ordinary skill in the art, after understanding the content and principle of the current disclosure, the form and details in the process may be modified or changed without departing from principles and structures of the present disclosure. The modifications and changes are still within the scope of claims in the current disclosure.

A user may send reservation information to the hotel management system 110 via the remote terminal 140. The remote terminal 140 may also receive confirmation information of user reservation information sent by the hotel management system 110. In some embodiments, the remote terminal 140 may be a smart phone, a personal digital assistant (PDA), a tablet computer, a notebook computer, a car computer, a handheld game player, smart glasses, a smart watch, a wearable device, a virtual display device or a display enhanced device. The remote terminal 140 may communicate with the hotel management system 110 via the network 130. As another example, the hotel service system may communicate with at least one remote terminal 140 via the network.

Figure 2:
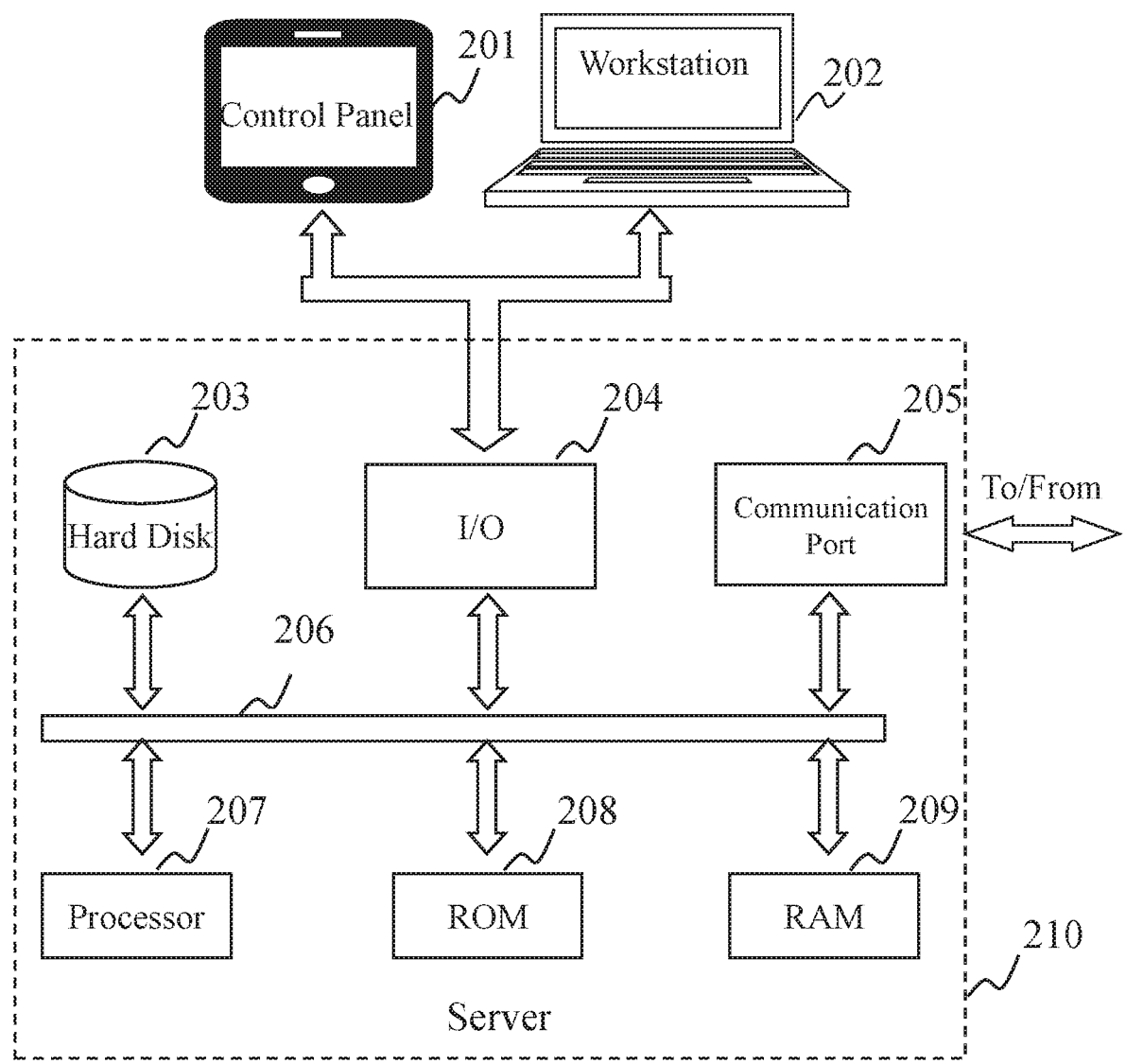
FIG. 2 is a schematic diagram illustrating an exemplary hardware and/or software components of an exemplary computer device on which the hotel management system may be implemented according to some embodiments of the present disclosure.

FIG. 2 is a schematic diagram illustrating an exemplary hardware and/or software components of an exemplary computer device 200 on which the hotel management system 110 may be implemented according to some embodiments of the present disclosure. Computer device 200 may implement the specific one or more components, modules, units, sub-units disclosed in hotel management system 110 in this application. The computer device 200 may be implemented by hardware device, software program, firmware, and combinations thereof. Computer device 200 may be a general-purpose computer or a specific-purpose computer. Both types of computers may be configured to implement a specific system according to some embodiments of the present disclosure. For convenience, only one server is depicted in FIG. 2. The related server described in this embodiment may be distributed which is implemented by a group of similar servers, processed and calculated by the distributed system.

The computer device 200 may include a control panel 201, a workstation 202, a hard disk 203, an input/output component 204, a communication port 205, an internal communication bus 206, a processor 207, a read only memory (ROM) 208, a random access memory (RAM) 209, and a server 210.

Figure 4:
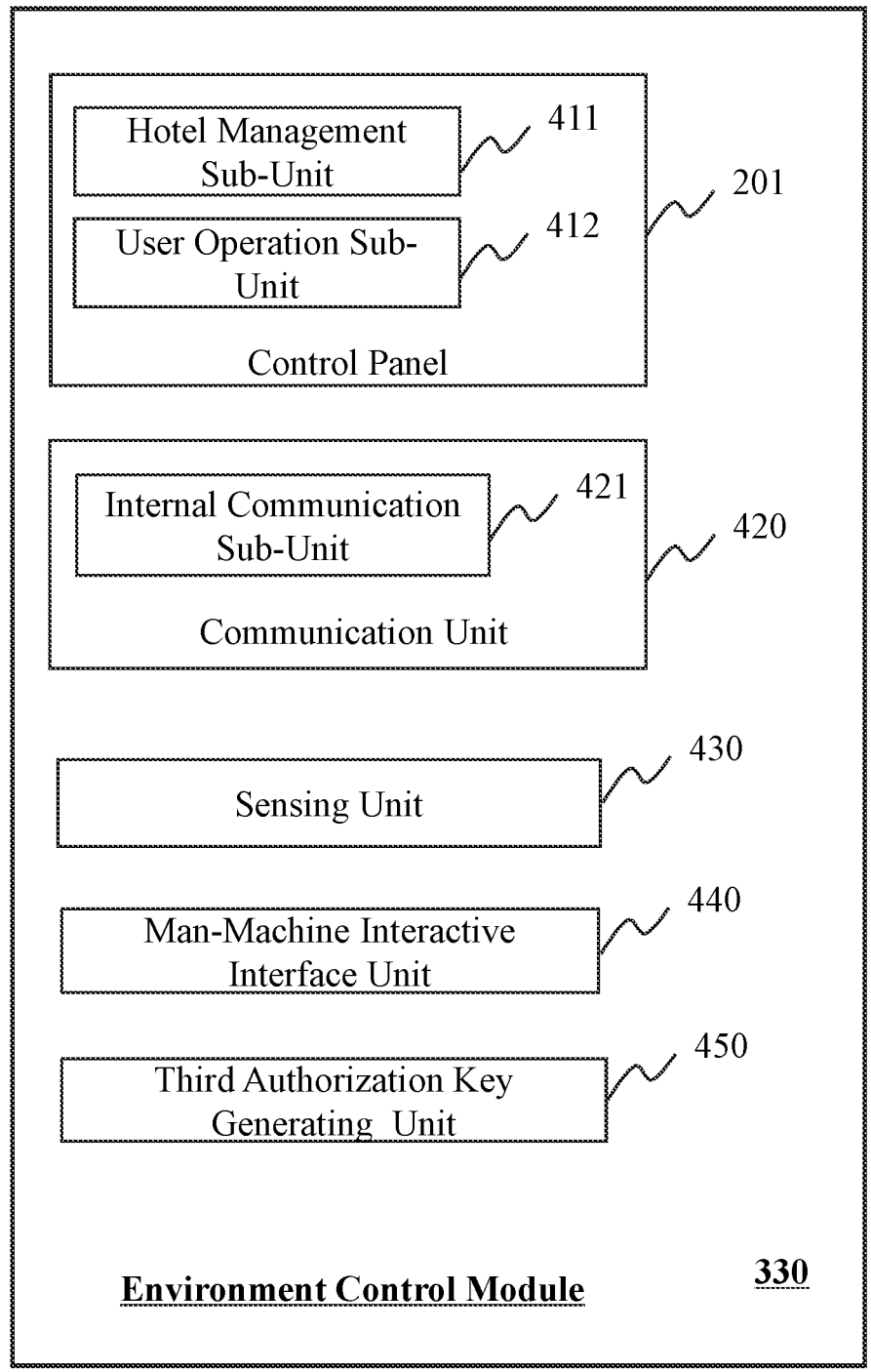
FIG. 4 is a schematic diagram illustrating an exemplary environment control module according to some embodiments of the present disclosure.

Detailed description related to the control panel 201 may be found elsewhere in the present disclosure (e.g., detailed description related to FIG. 4).

Workstation 202 may be one or more. In some embodiments, the workstation 202 may include one or more control systems of facilitating user interaction, operation, and monitoring. In some embodiments, the user may be a hotel administrative personnel. The hotel management may implement the following functions on the workstation 202: user's pending requests query, room status query, and environment control, event tracking system of user complaint and suggestion, and system of room bill settlement. For example, in some embodiments, workstation 202 may display environmental control requests sent by users and hotel administrative personnel. In some embodiments, workstation 202 may check the process of user authenticating successfully and entering the hotel management system in real time. The workstation 202 may operate the environment control system of each room. For example, the workstation 202 may modify the reservation information, or the like, or any combination thereof. The hotel manager may display the room environment control system through the workstation 202 and monitor the room environment. In some embodiments, workstation 202 may include combination of one or two or more of a display, a user interface, an expansion interface, or the like, or any combination thereof. In some embodiments, workstation 202 may be a smart mobile terminal. In some embodiments, the display may show information inputted by the hotel administrative personnel or provided to the user. The workstation 202 may also include various user graphical interfaces that may be composed of graphics, text, icons, video, and any combination thereof. The user interface allows the user to control operation instruction. The user may input an operation instruction or write operation parameters with an input/output device (e.g., a touch screen, a microphone, a keyboard, a mouse, a joystick, a touch pad, a touch pen, a voice recognition device, a gesture recognition device, etc.) The description related to the workstation 202 is not limited to the above mentioned example, and those skilled in the art may make other modifications based on the characteristics of the workstation.

The hard disk 203 may be a device that stores information that uses magnetic energy. In some embodiments, the hard disk 203 may also be other devices that uses magnetic energy to store information, such as a floppy disk, a magnetic tape, a magnetic core memory, a magnetic disk memory, a flash memory, or the like, or any combination thereof. Read only memory (ROM) 208 and/or random access memory (RAM) 209 may be a device that uses electrical energy to store information. A read-only memory (ROM) 208 may include an optical disk drive, a hard disk, a magnetic tape, a non-volatile random access memory (NVRAM), a non-volatile SRAM, a flash memory, an EEPROM, an Erasable Programmable Read-Only Memory, programmable read-only memory, or the like, or any combination thereof. The random access memory (RAM) 209 may include dynamic random access memory (DRAM), static random access memory (SRAM), thyristor random access memory (T-RAM), zero-capacitance random access memory (Z-RAM), or the like, or any combination thereof.

Input/output component 204 may support input/output data flow between computer device 200 and other components of hotel service system 100 (e.g., hotel management system 110, remote terminal 140, etc.) For example, input/output component 204 may support for receiving, sending, displaying and printing information. In some embodiments, the input/output component 204 may include a keyboard, a touch device, a mouse, a mechanical simulation device, a wearable device (e.g., 3D eyes, mechanical gloves, etc.), a virtual reality device, an audio input device, an image input device, and a remote control device, or the like, or any combination thereof, or a combination thereof. The output information may or may not send to the user. The non-transmitted output information may be stored in the hard disk 203, a read only memory (ROM) 208, a random access memory (RAM) 209, or deleted. In some embodiments, the user may input some of the original parameters or set initialization conditions for the corresponding data preprocessing via the input/output component 204. In some embodiments, some input information may come from an external data source (e.g., a floppy disk, a hard disk, an optical disk, a memory chip, a wired terminal, a wireless terminal, etc., or a combination thereof). The input/output component 204 may receive information from other modules or units or send information to other modules or units in the hotel service system 100.

Communication port 205 may implement data communication between computer device 200 and other components of the hotel service system 100 (e.g., the hotel management system 110, the remote terminal 140, or the like, or any combination thereof.). The computer may send and receive information and data from the network through the communication port 205. The hotel service system 100 may output information in the form of numbers, characters, instructions, pressure, sounds, images, systems, software, programs, or the like, or any combination thereof.

Internal communications bus 206 may implement data communication between components of computer device 200. The processor 207 may execute program instructions to implement any of the functions, components, modules, units, sub-units of the hotel management system 110 described in this application. Processor 207 may include one or more processors. The communication port 205 may implement data communication (e.g., via the network 130) between the computer device 200 and other components of the hotel service system 100 (e.g., the hotel management system 110 or the remote terminal 140). The computer device 200 may also include various forms of program storage units and data storage units such as a hard disk 203, a read only memory (ROM) 208, a random access memory (RAM) 209, storing various data files used for computer processing and/or communication, and possible program instructions executed by the processor 207. Input/output component 204 supports input/output data flow between computer device 200 and other components of hotel service system 100 (e.g., hotel management system 110 or remote terminal 140). Computer device 200 may also send and receive information and data from network 130 via communication port 205.

In some embodiments, the processor 207 may control the hotel service system 100 and/or the remote terminal 140. In some embodiments, the processor 207 may receive information from the hotel management system 110 and the remote terminal 140 or send information to the above system/device. In some embodiments, the processor 207 may receive information from the target object related to the hotel management system 110. In some embodiments, processor 207 may execute programs, algorithms, software, or the like, or any combination thereof.

In some embodiments, the processor 207 may execute instructions from remote terminal 140. The processor 207 may control the hotel management system 110 by processing and/or translating the above instructions. For example, the processor 207 may process the user input information through the remote terminal 140 and convert the information into one or more corresponding instructions. The instruction may be a user input instruction, a user verification instruction, a user authorization instruction, or the like, or any combination thereof. In some embodiments, the workstation 202 may also be integrated in an external computing device for controlling the hotel management system 110 and/or the remote terminal 140 or the like, or any combination thereof.

Computer device 200 may also refer to one or more forms of storage devices for storing data, programs, and/or algorithms, or the like, or any combination thereof. For example, the storage device may be a read only memory (ROM) 208, a random access memory (RAM) 209, a cloud storage (not shown in the figure), or the like, or any combination thereof. The storage device may store various data files used for the computer processing and/or communication, as well as possible program instructions executed by the processor 207. The storage device may be internal to the hotel service system 100, or external to the hotel service system 100 (e.g., an external storage device or cloud storage, and the like connecting via a network). A storage device (e.g., hard disk 203, read-only memory (ROM) 208, random access memory (RAM) 209, cloud storage, etc.) may store information from the hotel service system 100 and the remote terminal 140. The information may include image, programs for data preprocessing, software, algorithms, data, text, numbers, images, audio, and the like used during data preprocessing, or a combination thereof.

Those skilled in the art may understand that various changes and modifications may be made in the disclosure of the present disclosure. For example, the different system components described above are implemented by hardware device, but it is also possible to implement them only through software solutions. For example, it may be implemented by installing the system on an existing server. In addition, the location information disclosed herein may be provided through a firmware, a combination of firmware/software, a combination of firmware/hardware, or a combination of hardware/firmware/software.

Figure 3:
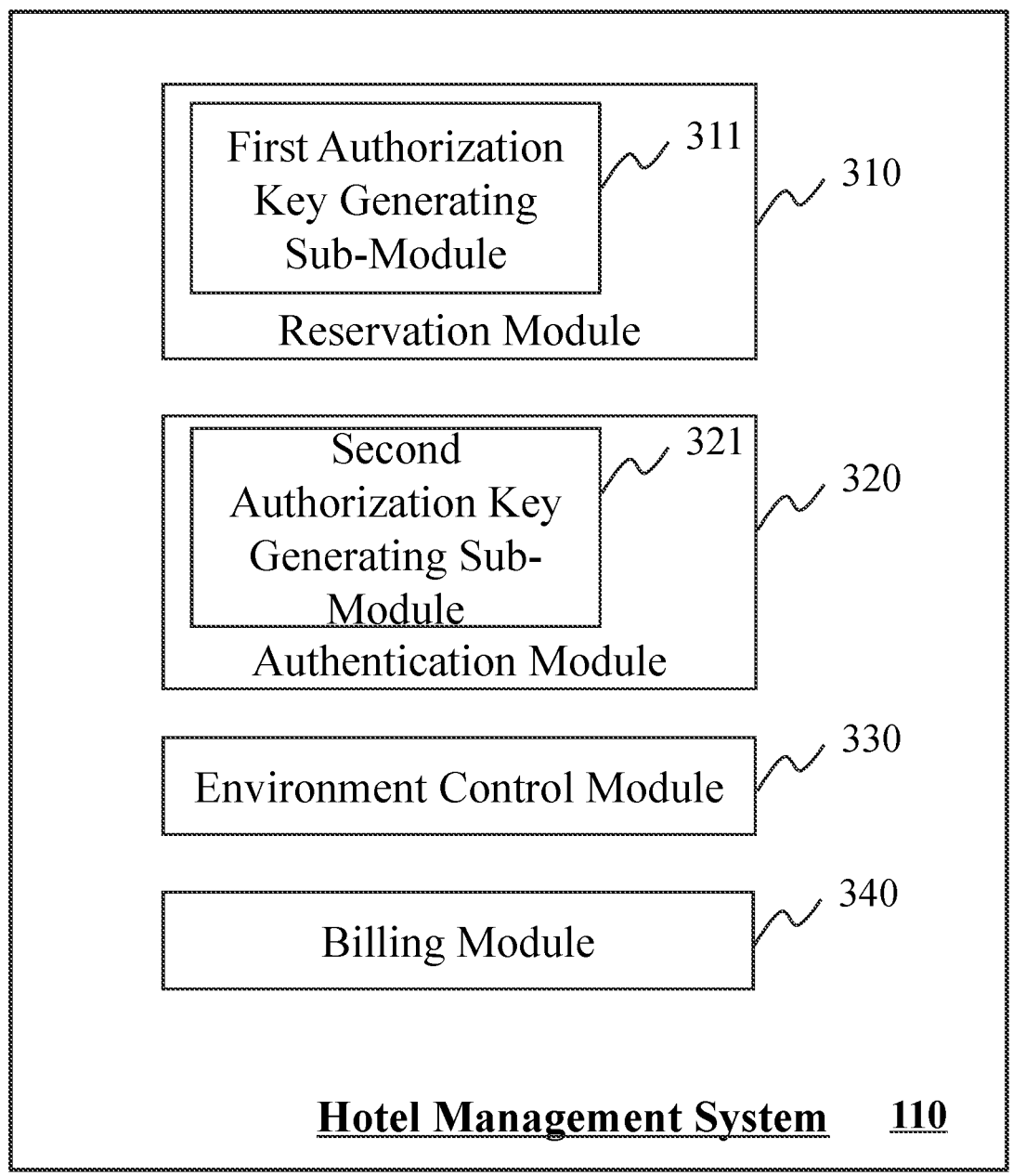
FIG. 3 is a schematic diagram illustrating an exemplary hotel management system according to some embodiments of the present disclosure.

FIG. 3 is a schematic diagram illustrating an exemplary hotel management system according to some embodiments of the present disclosure. The hotel management system 110 may include a reservation module 310, an authentication module 320, an environment control module 330, and a billing module 340. The connection form between the modules of the hotel management system 110 may be a wired connection, a wireless connection, or a combination thereof. The various modules of hotel management system 110 may be local, remote, or a combination thereof. A correspondence relationship between the modules of the hotel management system 110 may be one-to-one, one-to-many, or many-to-many. For example, hotel management system 110 may include one reservation module 310 and one authentication module 320. For another example, the hotel management system 110 may include a plurality of hotel reservation modules 310 and a plurality of authentication modules 320. The plurality of authentication modules 320 may correspond to the hotel reservation modules 310 to process the hotel reservation information from the corresponding authentication module 320 respectively.

The reservation module 310 may be configured to receive user's reservation information. In some embodiments, reservation module 310 may receive user reservation information sent by the remote terminal 140. In some embodiments, the reservation module 310 may receive user reservation information inputted via the workstation 202. In some embodiments, the reservation information may include but not limited to a check-in time, a check-out time, a room number reserved by the user, an amount of rooms reserved by the user, a reservation budget, whether breakfast being included or not, identity verification information of the user, or the like, or any combination thereof. The identity verification information may include a user registration code, an ID card scan of the user, a passport scan of the user, a user's face image, a mobile phone number of the user, an online signature of the user, debit card or credit card information of the user, and biometrics information of the user (e.g., palm print information, voice recognition information, fingerprint information, and iris scan information, etc.) In some embodiments, reservation module 310 and the remote terminal 140 may be configured to achieve a direct data communication. For example, the remote terminal 140 may communicate with the reservation module 310 remotely via a network, and a user may inquire whether a room of the hotel is available or a price of the room of the hotel via the remote terminal 140. The remote terminal 140 may send user information to the reservation module 310 via the network. For example, user information may include the user's name, the user's identification, the user's reservation information (e.g., reserved room number and check-in time, etc.), the user's contact information, the user's membership level information, the user's personalized service demand information (e.g., cleaning service demand, taxi calling service demand, etc.) In some embodiments, the reservation module 310 may analyze and process the user information and may generate a processing result. In some embodiments, the processing result may include but not limited to a user electronic tag generated by processing the user information. The reservation module 310 may generate a mobile device electronic tag for the remote terminal 140. The electronic tag is a storage medium for user authentication, and a main identifier of the first authorization key. The user may use a first authorization key containing the electronic tag to implement at least one of hotel management verification, room door verification, or hotel consumption billing service, or the like, or any combination thereof. In some embodiments, the electronic tag may provide an RFID-based electronic tag that may be used as user identification. The reservation module 310 may send the processing result to the remote terminal 140 and may also feedback the processing result to the workstation 202 for displaying the processing result to the hotel administrative staff.

In some embodiments, the reservation module 310 may also include a first authorization key generating sub-module 311 to generate a first authorization key. The user may obtain an access to a facility of the hotel based on the first authorization key. The first authorization key may also be configured to store a user electronic tag. The first authorization key may be used as a tool for check-in authentication in order to use the user's electronic tag as a tool for entering the hotel management system 110. The reservation module 310 (or the first authorization key generating sub-module 311) may bind the reservation information of the user with the identity verification information of the user to generate the first authorization key. For example, the first authorization key may include a user electronic tag, a mobile device electronic tag, a check-in time, a check-out time, a room number reserved by the user, an ID card scan of the user, a passport scan of the user, a user's face image of the user, voice recognition information of the user, an online signature of the user, palm prints and fingerprints information of the user, or the like, or any combination thereof.

In some embodiments, the reservation module 310 (or the first authorization key generating sub-module 311) may update the first authorization key based on user modification. When the user modifies any of the reservation information or the identity verification information, the reservation module 310 may rebind the updated reservation information or the updated identity verification information to generate the first authorization key, by which the first authorization key is updated.

In some embodiments, the remote terminal 140 may receive the first authorization key in one or more formats, such as a two-dimensional code (e.g., a quick response code), a short message, a WeChat™ message, a URL hyperlink, or the like, or any combination thereof. For example, the user may implement the hotel check-in authentication by entering a text message or a WeChat™ message encoding the first authorization key. As another example, user may implement the hotel check-in authentication by clicking on the URL hyperlink. For another example, the user may implement the hotel authentication by scanning the two-dimensional code. In some embodiments, the first authorization key may be bound to the remote terminal 140. For example, users may implement hotel authentication via non-contact modes. The non-contact mode may be an RFID (Radio Frequency Identification) technology, and may also be a short-distance communication technology such as near field communication (NFC) or Bluetooth.

The authentication module 320 may be configured to verify the first authorization key provided by the user to verify the identity of the user. In some embodiments, the user may input the first authorization key 311 via the control panel 201 and complete the authentication process. In some embodiments, after receive the first authorization key, the control panel 201 may transmit the first authorization key to the server 210. The control panel 201 may be installed at a facility where the user needs to successfully complete the authentication process to obtain the access to the facility, such as a hotel lobby, a hotel entrance, a hotel parking lot, an elevator entrance of the hotel, or the like, or any combination thereof.

In some embodiments, the user may obtain the first authorization key via the network before checking into the hotel. When the user arrives at the hotel and wants to check in, the user may send the first authorization key to the control panel 201. The authentication module 320 may query the user reservation information and/or the identity verification information in the server 210 based on the first authorization key, and compare the first authorization key with the identity verification information and/or the reservation information. If first authorization key is consistent with the identity verification information, the control panel 201 allows the user to enter the hotel management system 110 and makes the automatic device of the room in a working mode.

In some embodiments, the authentication module 320 may upload the first authorization key 311 to the server 210 via the network, and the server 210 verifies the stored user reservation information and identity verification information with the first authorization key. If the server finds the user reservation information and the verification information corresponding to the first authorization key 311, it may indicate that the first authorization key verification is successful, that is, the user who owns the first authorization key is authenticated successfully. In some embodiments, server 210 may send the user a result of successful authentication. For example, when the user sends the first authorization key to the authentication module 320 through the WeChat™ message, the server may send the successful verification result to the remote terminal 140 using the authentication module 320 in the form of a WeChat™ message. After the verification is successful, the authentication module 320 may use the first authorization key to put the automatic equipment in the room into working condition.

If the server 210 does not find the user reservation information and the verification information corresponding to the first authorization key, the server 210 does not respond to the first authorization key. The first authorization key is failed to verify. The server 210 optionally returns the result of the verification failure to the remote terminal 140.

In some embodiments, the authentication module 320 may include a second authorization key generating sub-module 321 to generate a second authorization key. If the user successfully complete the authentication process (e.g., the check-in authentication process), the hotel management system 110 (e.g., the authentication module 320 or the second authorization key generating sub-module 321) may generate and send the second authorization key to the user (e.g., send the second authorization key to the remote terminal 140 of the user). The second authorization key may be the same as or different from the first authorization key. The second authorization key may provide an access configured to allow the user to pass the authorization of an entrance guard of the room (e.g., allow the user to open the door of the room). For example, when the remote terminal 140 enters the access control area, the second authorization key 321 corresponds to the access permission of the hotel room. For example, the second authorization key 321 may be a dynamic password, biometrics, non-contact sensors, keys, and the like. For example, the authentication module 320 sends the dynamic password and the room-related information to the remote terminal 140 that is bound to the first authorization key. When the authentication module 321 receives the dynamic password, the dynamic password may be authenticated, and the room environment control is turned on after the authentication is successful. Users may also adjust the booking information. For example, user may modify the check-in time, breakfast service, and the like. In some embodiments, the authority of the second authorization key may be the right to open a dedicated door of a room on a certain day of a certain year to a certain day of a certain year. In some embodiments, the second authorization key 321 may be associated with one or more of reserved user-dedicated doors, elevator doors, elevator floors, room doors, restaurant doors, and the like, and may be set to be valid only for a certain period of time. In some embodiments, if the second authorization key 321 is verified to be consistent with the user reservation information and the verification information, the user may enter the hotel room. If it is verified that the second authorization key 321 is not consistent with the user reservation information and the verification information, the authentication module notifies the user that the authentication has failed. Wherein, the voice prompting device may prompt the user to verify the authentication failure. For example, after the user fails to use the second authorization key 321 in the fingerprint category, the authorization module 320 may prompt the user to perform fingerprint verification again. In addition, the number of prompt may also be set. For example, after the authorization module 320 prompts the user to re-verify the fingerprint 3 times to 5 times and still fails the verification, the authorization module 320 determines that the user's verification has failed and may not enter the door. The authorization module 320 may prompt the user no more verification. The prompt manner may be a voice prompt.

Biometric identification in the present disclosure may refer to the identification of entry and exit by means of inspecting the biological characteristics of personnel, such as fingerprint information, finger vein information, iris scan information, face recognition information, or the like, or any combination thereof. In some embodiments, the authorization module 320 may capture a face image of a user located in front of the room door, analyze the face image and match it with the face image in the user reservation information and the authorization information. If there exists matching face image, the authorization module 320 may be configured to provide the user access control for entering the room. In some embodiments, the authorization module 320 may capture the fingerprint or palm print of the user located in front of the room door, and analyze the fingerprint or palm print to match the fingerprint or palm print in the user reservation information and the authorization information. If there is a matching fingerprint or palm print, the authorization module 320 may be configured to provide the user access control for entering the room.

The environment control module 330 may control the room environment system. In some embodiments, the environment control module 330 may include a control panel 201 and a sensing module 412. The hotel management system 110 may receive the environment control request sent by the user through short-distance wireless communication technology and/or long-distance communication technology. The user may be a hotel administrative personnel, a user, and/or other person, entity, device, and the like that uses the hotel management system 110. The environment control module 330 may collect user information. The user information may include: user name, user identification, user reservation information (e.g., reservation room number and check-in time, etc.), user contact information, user membership level, and user personalized needs (for example, cleaning service, hotel call service, etc.) The environment control module 330 may verify the user's identity, door unlock, check-out lock, consumption data statistics, and room environment control by processing the user's environment control request. In some embodiments, the environment control module 330 may implement the functions of the user's second authorization key verification, room door unlock, room check-out lock, and room environment control by processing the user's environment control request.

The billing module 340 may implement hotel consumption mode. After the user successfully uses the control panel 201 to complete the unlocking of the room door, the room is checked in. The billing module 340 may receive the user's consumption data in real time and generate a consumption record. In some embodiments, sensors are installed near a seal of a commodity of the room. If the user opens the seal, the sensor may be triggered and the billing module 340 may automatically calculate the price of the commodity. In some embodiments, after the billing module 340 receives the user's check-out settlement instruction, the billing module 340 may send the settled consumption information to the remote terminal 140 for confirmation by the user. After the user confirms, the user's consumption record is generated and stored. In some embodiments, the check-out settlement instruction may be user moving out of the room, and the check-out instruction may be send to the billing module 340 through the remote terminal 140. In some embodiments, the hotel management sub-unit 411 may abort the room environment control system and may display the received user's consumption records and payment results via the control panel 201.

FIG. 4 is a schematic diagram illustrating an exemplary environment control module 330 according to some embodiments of the present disclosure. The environment control module 330 may include a control panel 201, a communication unit 420, a sensing unit 430, a man-machine interactive interface unit 440, and a third authorization key generating unit 450. In some embodiments, the environment control module 330 may receive, send, and process a room environment control request initiated in the workstation 202. In some embodiments, the environment control module 330 may receive, send, and/or process a room environment control request initiated in the control panel 201 or the remote terminal 140. The environment control module 330 may synchronize information, back up information, and remotely transmit to the server. For example, the environment control module 330 may transmit the information of the room of the hotel (e.g., idle status, occupancy status, price information, etc.) to the hotel management system 110 via the network. The remote terminal 140 may send a room environment control request to the environment control module 330. The remote terminal 140 may send a room environment control request to the control panel 201, and may also receive the unlock instruction sent by the workstation 202 for matching the unlock instruction. In some embodiments, the remote terminal 140 may be a smart phone, a personal digital assistant (PDA), a tablet, a laptop, a car computer, a handheld game console, smart glasses, a smart watch, a wearable device, a virtual display device or display enhanced device.

It should be noted that the above mentioned environment control module merely serve as exemplary illustration according to some embodiments of the present disclosure. For a person of ordinary skill in the art, after understanding the content and principle of the current disclosure, the form and details in the environment control module may be modified or changed without departing from principles and structures of the present disclosure. For example, two of the units may be integrated into one unit, or one of the units may be divided into two or more units. The connection form between the units of the environment control module 330 may be a wired connection, a wireless connection, or a combination of both. The units of the environment control module 330 may be local, remote, or a combination of both. The correspondence between the units of the environment control module 330 may be one-to-one, one-to-many, or many-to-many. For example, the environment control module 330 may include one control panel 201 and one communication unit 420. For another example, the environment control module 330 may include a plurality of control panels 201 and a plurality of communication units 420 to process the hotel reservation information from the corresponding authentication module 320 respectively.

The control panel 201 may perform the environment control process of the room based on the received environment control request. In some embodiments, the environment control request may include but not limited to a reservation instruction (e.g., an instruction related to a user to reserve the room of the hotel), an unlocking instruction (e.g., an instruction for the user to open the door of the room), a room device control instruction (e.g., an instruction related to control luminance, humidity, security, temperature, electric appliance, or other devices of the room of the hotel), a consumption payment instruction, and a check out instruction (e.g., an instruction related to checking out of the room), or the like, or any combination thereof. The control panel 201 may implement user information identification according to the user's geographical location and/or the user's biological information. For example, the control panel 201 may obtain the user's voice information, video information, fingerprint information and other information through the camera and other sensors. The control panel 201 may use the recognition technology such as speech recognition technology, face recognition technology, fingerprint recognition technology, pupil recognition technology, or the like to process the acquired information to verify the user identity information. For another example, the control panel 201 may determine a distance between the control panel 201 and the remote terminal 140 through the short-distance wireless communication technology to determine whether the user's geographic location (or the location of the remote terminal 140) is within the user information identification interval. In some embodiments, the control panel 201 may receive the first authorization key from the remote terminal 140 through a short-distance wireless communication technology. The control panel 201 may send the second authorization key to the remote terminal 140 through short-distance wireless communication technology. The room device may include but not limited to an air conditioner, a socket, a central hot water equipment, a router, a humidifier, a home appliance (e.g., a television, a refrigerator, a microwave oven, etc.). The short-distance wireless communication technology means that there is no restriction on the physical connection, and it may access the network anytime and anywhere to obtain information. The short-distance wireless communication technology has a wide range. As long as the communication transceiver may transmit information through radio waves and the transmission distance is limited within a short range, it may be referred to as short-distance wireless communication. For example, it may include but not limited to a combination of one or two or more of a wireless network module, a Bluetooth module, a GPRS module, a near field read/write module, a ZigBee module, and other 2.4 GHz modules, or the like, or any combination thereof.

The control panel 201 may be operated in a contactless way or in a remote way. In some embodiments, the control panel 201 may further include a hotel management sub-unit 411 and a user operation sub-unit 412.

The hotel management subunit 411 may receive the environment control request sent by the user via the remote terminal 140 or the inputted directly by the user via the control panel 201 and make a corresponding operation according to the environment control request. In some embodiments, the hotel management subunit 411 may analyze the received user information to determine the user's behavior habit data (e.g., according to the user's historical consumption records in the hotel, the hotel management subunit 411 may learn the user's favorite temperature, humidity, etc.) Before the user check-in, the server 210 may generate a hotel control instruction matching the user's behavior habit data and transmits the hotel control instruction to the control panel 201. The control panel 201 may perform control of the room device in accordance with the hotel control instructions. The room environment may be tuned to the user's habitual environment before, after or during the check-in. For example, the server 210 generates an air conditioning control instruction based on the above data and transmits the instruction to the control panel 210. The control panel 210 may adjust the air conditioning control to the corresponding temperature according to the instruction before, after or during the check-in the check-in. The user may feel a comfortable environment while entering the room. Further, the control panel 210 may control the opening or closing of the curtain and adjust the light in the room. The opening or closing of the curtain may be controlled by a switch.

In some embodiments, the hotel management subunit 411 may generate corresponding control instructions according to the personalized demand of the user (e.g., the user's favorite temperature, humidity, light, whether curtain being opening or closed, etc.) provided by the user when the room is reserved. These instructions may be transmitted to the control panel 201. The hotel management subunit 411 may control the corresponding room device in the room and adjusts the environment in the room based on these instructions.

In some embodiments, the hotel management sub-unit 411 may remotely control the room devices in an available state within the remote control. For example, after the first authorization key is successfully verified, the hotel management subunit 411 may automatically generate authentication of the room, and control the room devices in an available state.

The user operation subunit 412 may receive the environment control request sent by the user and make a corresponding operation. The user may use the remote terminal 140 to operate remotely. In some embodiments, the remote terminal 140 may be connected to the user operation subunit 412 through a network. The remote terminal 140 may execute a hotel consumption mode, a smart lighting mode, a temperature/humidity control mode, or the like, or any combination thereof. It should be noted that the above mentioned examples are just for illustrative purposes, and practical applications are not limited thereto. Obviously, for a person of ordinary skill in the art, after understanding the content and principle of the current disclosure, the form and details in the process may be modified or changed without departing from principles and structures of the present disclosure.

In some embodiments, the user operation subunit 312 may perform a smart lighting mode. The user may use the control panel 201 to select lighting area that may be one or more rooms, and to select one or more lights, or lights for all areas, and the like. For example, the room may include a combination of one or more of a kitchen, a bedroom, a living room and a toilet, and the like. Icons that indicate different areas may also be dragged to change the position on the interface. In some embodiments, the user may use the remote terminal 140 to remotely control the control panel 201 to perform room environment control.

In some embodiments, the user operation subunit 412 may perform a temperature and humidity control mode. Users may check and/or change the environmental information (e.g., temperature, humidity, and body temperature) of each room or area.

In some embodiments, the installation position of the control panel 201 is not limited and may be installed at a place where the user needs to implement authentication, such as hotel lobby, hotel access control, hotel entrance, hotel parking lot, hotel elevator entrance and the like. The control panel 201 may be connected to the hotel management system 110 through an interface. The wired connection type of the interface may include but is not limited to a UART (Universal Asynchronous Receiver/Transmitter), an I2C (Inter-Integrated Circuit), a SPI (Serial Peripheral Interface), and the like. The type of the interface may also be customized, including but not limited to custom the number and function of pins on the interface. These functions include, but are not limited to, power supply, hardware connection handshake, or communication. The wireless connection type of the interface may include but is not limited to Bluetooth or Wi-Fi. The descriptions about the interface are not limited to the above situations, and those skilled in the art may make other modifications according to the use characteristics of the interface.

The communication unit 420 may be configured to receive wireless information transmitted by the remote terminal 140. In some embodiments, the sending mode may include, but is not limited to, short-distance wireless communication technology. For example, the short-distance wireless communication technology may be a combination of one or more of a wireless network module, a Bluetooth module, a GPRS module, a near field read/write module, a ZigBee module, and other 2.4 GHz modules, and the like. In some embodiments, when the remote terminal 140 reaches a position within a recognizable section of the control panel 201, the remote terminal 140 may send wireless information to the control panel 201. The wireless information may include one or more than two information of location information of the remote terminal 140, a first authorization key requested by the user, check-in time, check-out time, and the like. The location information may include, but is not limited to, the distance in front of the hotel's control panel 201 where the user's handheld remote terminal 140 is located. The communication unit 420 may obtain the first authorization key 311 and the second authorization key 312 of the remote terminal 140, and then transmit them to the hotel management system 110 through the network.

In some embodiments, there may be an internal communication subsystem between the communication units in different rooms. For example, a family lives in multiple rooms, and users may authorize management and keys between rooms.

The sensing unit 430 may trace, detect and/or monitor physical quantities in the environment. Then the sensing unit 430 may convert the above physical quantities into electrical signals. The electrical signals may be stored as data in the sensing unit 430. The data may possess characteristics such as time, subject, unit, weather, etc. The sensing unit 430 and the communication unit 420 may communicate in real time, and send the acquired data to the control panel 201. The data may be displayed in the man-machine interactive interface unit 440 (for example, "on Dec. 11, 2016, the room temperature is 23 degrees Celsius, Humidity is 45%"). The above descriptions of the exemplary control panel are provided only for illustrative purposes. A person skilled in the art may make various modifications and variations in forms or details in regards to the control panel without any creative work. For example, two of the units may be combined into one unit, or one of the units may be divided into two or more units.

The sensing unit 430 may detect and monitor various physical quantities in the environment, such as voice, light, time, weight, location, temperature, humidity, pressure, current, speed and acceleration, inhalable particles, radiation, text, images, touching, pupils, fingerprints, etc. The sensing unit 430 may detect and/or monitor one or more of these parameters and may also store and organize them for further analysis and processing. The sensing unit 430 may convert the above physical quantities into electrical signals via tracing and detecting and/or monitoring the physical quantities in the environment. The electrical signals may be stored as data in the sensing unit 430. The data may possess characteristics such as time, subject, unit, weather, etc. The sensing unit 430 and the communication unit 420 may communicate in real time, and send the acquired data to the control panel 201. The data may be displayed in the man-machine interactive interface unit 440 (for "example, on Dec. 11, 2016, the room temperature is 23 degrees Celsius, Humidity is 45%").

The sensing unit 430 may take full advantage of all usable devices, including but not limited to a temperature sensor, a luminance sensor, a humidity sensor, an ambient light sensor, a gas sensor, and a pheromone sensor (which may also be a kind of gas sensor), a motion sensor, an image sensor (such as but not limited to a camera), a fingerprint sensor, or the like, or any combination thereof. The above mentioned examples of sensors are merely to illustrate are only for illustration purpose, while the sensor unit 430 may also include other sensors. The sensing unit 430 may trace and monitor various physical quantities in the environment. Then the sensing unit 430 may convert the above physical quantities into electrical signals. The electrical signals are stored as data in the sensing unit 430. The data may be in the form of, but not limited to, for example, binary system, octal system, decimal system, hexadecimal system, sexagesimal system, or the like, or any combination thereof. The data may possess characteristics such as time, subject, unit, weather, etc. The time may be in the form of, but not limited to, for example, nanosecond, microsecond, millisecond, seconds, minute, hour, year, month, day, morning, afternoon, noon, dawn, dusk, midnight, or the like, or any combination thereof. The data may possess one or more subjects, and/or belong to one or more the subjects. The subject may include but not limited to the living room, bedroom, dining room, toilet, balcony, basement, kitchen, refrigerator, microwave oven, television, personal computer, porch, or the like, or any combination thereof. It should be noted that the subjects to which the data belong as mentioned herein are just for the convenience of illustration, while the subjects to which the data belong may be defined and classified flexibly according to the application scenarios, application field, and application object, etc. The subjects to which the data belong may be any one or more extensive subjects. The data may have but are not limited to the following units: Celsius degree, Fahrenheit degree, lux, Pascal, meter, millimeter, micron meter, ampere, volt, ohm, mu, etc. In some embodiments, the sensing unit 430 is installed in each room of the hotel. In some embodiments, the control panel 201 may be installed in room of the hotel. Each room may include one or more environmental control systems.

The man-machine interactive interface unit 440 may be one or more. In some embodiments, man-machine interactive interface unit 440 may include one or more user-information interactions, operations, and monitoring environment control systems. In some embodiments, the user may be a hotel manager. The hotel management personnel may display the following functions on the man-machine interaction unit 440: user requests pending box, room status query, environment control, event tracking system for user complaint and suggestion, and system of room consumption check-out. For example, in some embodiments, the man-machine interactive interface unit 440 may display environment control requests from users and hotel managers. The man-machine interactive interface unit 440 may operate the environment control system of each room (e.g. modifying room reservation, and the like). The hotel manager may check the room environment control and monitor the room environment through the man-machine interactive interface unit 440. In some embodiments, the man-machine interactive interface unit 440 may include a combination of one or two or more of a workstation, a display, a user interface, and an expansion interface. In some embodiments, the man-machine interactive interface unit 440 may be a workstation 202 and may also be a smart mobile terminal. In some embodiments, the man-machine interactive interface unit 440 may display information input by the hotel manager or information provided to the user. The man-machine interactive interface unit 440 may include various graphical user interfaces that may be composed of graphics, text, icons, video, and any combination thereof. The user interface screen may allow the user to execute the operation instructions. The user may use the input and output device (e.g., touch screen, microphone, keyboard, mouse, joystick, touch pad, touch pen, voice recognition device, gesture recognition device, etc.) to input operation instructions or write operation parameters. The description about the workstation is not limited to the above, and a person of ordinary skill in the art may make other modifications based on the usage characteristics of the workstation.

The third party may use the third authorization key to enter the room. For example, the user may issue a third authorization key to the hotel cleaning staff to enter the room.

Figure 5:
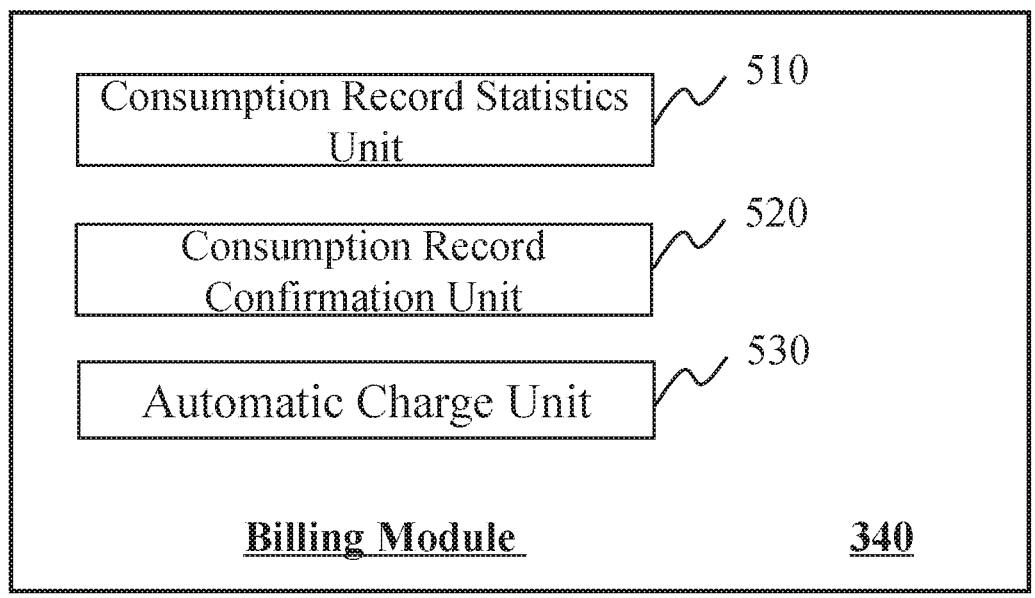
FIG. 5 is a schematic diagram illustrating an exemplary billing module according to some embodiments of the present disclosure.

FIG. 5 is a schematic diagram illustrating an exemplary billing module according to some embodiments of the present disclosure. The billing module 340 may include a consumption record statistics unit 510 and a consumption record confirmation unit 520, an automatic charge unit 530. The illustrated units may be directly and/or indirectly connected to each other. It should be noted that the above mentioned examples are just for illustrative purposes, and practical applications are not limited thereto. Obviously, for a person of ordinary skill in the art, after understanding the content and principle of the current disclosure, the form and details in the process may be modified or changed without departing from principles and structures of the present disclosure. For example, two of the units may be combined into one unit, or one of the units may be divided into two or more units.

The consumption record statistics unit 510 may receive the user's consumption data in real time and generate a consumption record. In some embodiments, sensors may installed at near a seal of a commodity for sale in the room of the hotel. If the user open the seal, the sensor will be triggered and the billing module 340 system will automatically generate a consumption record related to the commodity and determine a price of the commodity. The consumption record statistics unit 510 may automatically transmit the consumption activity time, commodity quantity and item code to the hotel management system 110 through the network when the user buys or consumes the commodity.

The consumption record confirming unit 520 may query the user's consumption record via the network to the hotel management system 110, and the hotel management system 110 may display the consumption record to the user. After the user checks the consumption record and confirms the consumption record, he or she may click the interface button or enter text to confirm. The consumption record may include the user's consumption location (i.e., room number), a consumption code, a consumption time, a name of the consumption item, quantity of consumption item, a consumption cost, whether an invoice being needed, an invoice header, promotion information, or the like, or any combination thereof.

The automatic charging unit 530 may automatically deduct user's consumption cost. In some embodiments, after the billing module 340 receives the user's check-out settlement instruction, the automatic charge unit 530 may automatically deduct user's consumption cost. The check-out settlement instruction may be a check-out instruction sent by the user. The method for transmitting the check-out instruction may perform data transmission through a network cable or wireless communication technology. The data of the check-out application information may include at least one or more combinations of room number, check-out time, consumption data, and the like. The user enters the payment page and selects the payment method while using it. After the payment is successful, the hotel management subunit 411 may stop the room environment control system, and may display the received user's consumption record and payment result through the control panel 201. The hotel management system 110 may initiate a transaction request to the bank transaction system and deduct the actual consumption cost of the user. After the transaction is completed, the hotel self-service terminal device may display the transaction result to the hotel guests.

Figure 6:
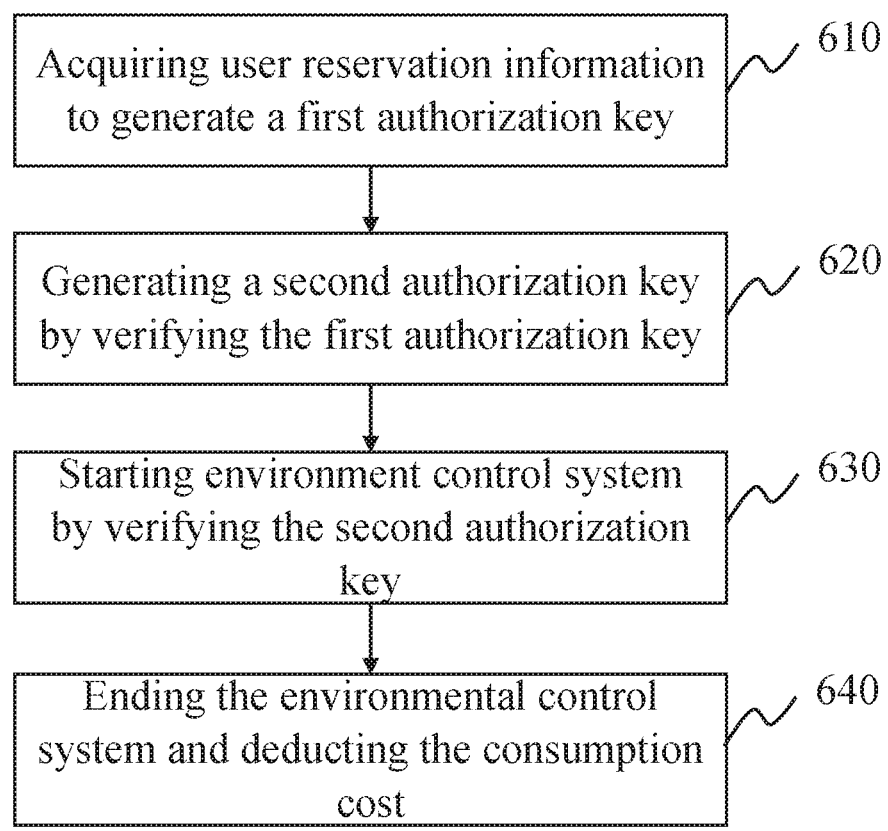
FIG. 6 is an exemplary flowchart illustrating an exemplary process for hotel managing according to some embodiments of the present disclosure.

FIG. 6 is an exemplary flowchart illustrating an exemplary process for hotel managing according to some embodiments of the present disclosure. In some embodiments, the hotel management process may further include obtaining user reservation information and generating a first authorization key 610, verifying the user's first authorization key and generating a second authorization key 620, verifying the user's second authorization key and starting the environment control system 630, and ending the environmental control system and deducting the consumption cost 640, and the like.

In step 610, the reservation module 310 may acquire user reservation information and send a first authorization key to the user. The reservation information may include but not limited to a check-in time, a check-out time, a room number selected by the user, an amount of room ordered by the user, a reservation budget, whether breakfast being included or not, verification information identity information, or the like, or any combination thereof. In some embodiments, the user reservation information may be sent directly via the remote terminal 140. In some embodiments, the remote terminal 140 may send wireless information to the control panel 201 when the remote terminal 140 is within an identifiable area of the control panel 201. The wireless information may include location information of the remote terminal 140, a check-in time, a check-out time, user's identity information and/or identification information (e.g., a user's name, an electronic tag, etc.), room reservation information, and information related to the remote terminal 140, or the like, or any combination thereof. The location information may include but not limited to identification information of a hotel and/or a room where the remote terminal 140 is located, identification information of the control panel 201 near the remote terminal 140, and a distance between the remote terminal 140 and the control panel 201. In some embodiments, the reservation module 310 may determine all hotel identification information (e.g., hotel number, etc.), room identification information (e.g., room number, etc.) and the first authorization key of each control panel 201. In some embodiments, the control panel 201 may determine the first authorization key and send it to the remote terminal 140.

In step 620, the authentication module 320 may verify the user's first authorization key. If the authentication is successful, the user may acquire an access to enter the hotel or the room reserved by the user based on the reservation information. After the user's identity is successfully identified, the control panel 201 may implement hotel management. In some embodiments, after the control panel 201 receives the first authorization key 311 sent by the remote terminal 140, the authentication module 320 may match the first authorization key 311 and generate a second authorization key 320. In some embodiments, the second authorization key may be an electronic door lock.

In step 630, the room environment may be controlled. For example, the user uses the second authorization key to control the automatic unlocking of the room door. In some embodiments, the second authorization key may be a mechanical door lock. The second authorization key may control the key capsule to pop up the key. The user may use the room key to unlock. In some embodiments, the user may use the control panel 201 to complete unlocking the room door and enter the room. In some embodiments, step 630 may be implemented by the environment control module 330. In some embodiments, the remote terminal 140 may be connected to the control panel 201 through the network 130, and the control panel 201 may implement a hotel consumption mode, a smart lighting mode, a temperature and humidity control mode, and the like. Further, the hotel management system 110 may analyze the received user information to obtain the user's behavior habit data. For example, according to the user's historical consumption records, learn the user's favorite temperature, humidity, and the like. Before the user check in, the hotel management system 110 may generate hotel control instructions based on the user's behavioral habit data, and transmit the control instructions to the control panel 201. The control panel 201 may perform control of the room devices in accordance with the hotel control instructions so that the environment of the room may be adjusted to the environment in which the user is accustomed. It should be noted that the above examples are only for understanding and the practical applications are not limited thereto. Those skilled in the technical field may completely perform other deformations or applications in understanding the principle. For example, combining this function with other functions may accomplish more complex tasks.

In step 640, the environment control module 330 may end the hotel management. In some embodiments, the user may execute the check-out instruction through the control panel 201. The check-out instruction may include one or two or more of the room number of the check-out room, consumption data, and payment information. The user may close the door and pay for the consumption cost according to the check-out instructions. Further, after the user completes the check-out instruction, the control panel 201 may end the hotel management, send the ending instruction to the hotel management system 110, and clear all the operations of the control panel 201.

In some embodiments, the user may treat the action of placing the key in the key capsule as the check-out instruction to end the hotel management. The control panel 201 may sense the reset of the key and send the check-out instruction to the hotel management system 110. The control panel 201 may end hotel management and clear all the operations.

Figure 7:
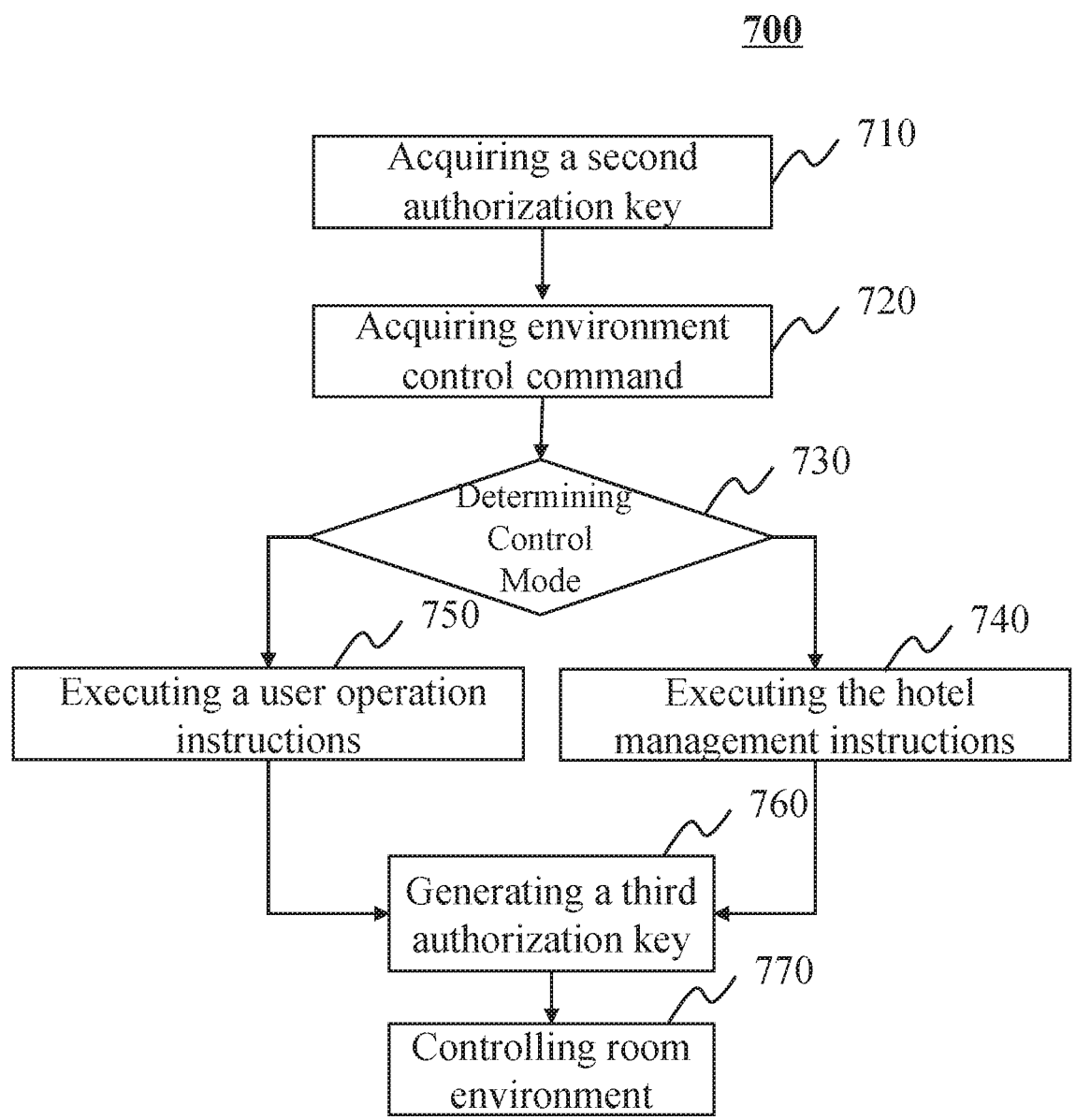
FIG. 7 is a flowchart illustrating an exemplary environment control process according to some embodiments of the present disclosure.

FIG. 7 is a flowchart illustrating an exemplary environment control process according to some embodiments.

In step 710, the authentication module 320 may send a second authorization key to the remote terminal 140, and the user may use the second authorization key to enter the room and turn on room environment control. If the second authorization key is successfully verified by the authentication module 320, the control panel 201 may open the electronic door lock of the room of the hotel and perform step 720; if the verification fails, the electronic door lock may not be opened.

In step 720, the environment control module 330 may initiate performing room environment control operations. In some embodiments, after the authentication module 320 successfully verify the second authorization key sent by the user, the room door may be opened and the room environmental control may be initiated. In some embodiments, the room environmental control may be initiated in an automatic way. For example, after the control panel 201 may match the second authorization key, and the door sensor may sense that the door has been opened, the door opened information may be sent to the hotel management system 110. The hotel management system 110 may automatically activate the room environmental control.

In step 730, the hotel management system 110 may determine the control mode. The sensing module 430 may send the collected information to the hotel management system 110. The hotel management system 110 may analyze the collected information. The analysis decision method may include, but is not limited to, comparing the collected information with a certain parameter (e.g., a reference value, reference interval, threshold, preset value or predicted value). The parameters may be set by the user or may be obtained by hotel manager based on the historical data of the environmental control system. After analyzed by the server 210, if the acquired information satisfies a certain parameter requirement (e.g., a reference value is met, a certain reference interval is entered, a certain threshold/preset value/predicted value is exceeded, etc.), the information is user information. In some embodiments, it may be selected to be performed by a user operation instruction. Further, it may also be implemented according to the hotel management instructions. In some embodiments, the control panel 201 may verify the user information and the second authorization key received from the remote terminal 140 with the user information and the second authorization key 321 received from the hotel management system 110. If the verification succeeds, the control panel 201 may open the key capsule and pop up the key. If the verification fails, the key capsule may not be opened, and the key may not be popped up. Step 750 may be performed. In some embodiments, the server 210 may generate a corresponding one-to-one corresponding second authorization key through the codec software, and send them to the remote terminal 140 and the control panel 201 respectively. Further, the codec software may be periodically replaced.

In step 740, hotel management system 110 may execute hotel management instructions. In some embodiments, the hotel management sub-unit 411 may receive the environment control request sent by the user, and the hotel manager may perform corresponding operations according to the environment control request. In some embodiments, the hotel management system 110 may analyze the received user information to obtain the user's behavior habit data. For example, according to the user's historical consumption records, learn the user's favorite temperature, humidity, and the like. Before the user check in, the hotel management system 110 may generate hotel control instructions based on the user's behavioral habit data, and transmit the control instructions to the control panel 201. The control panel 201 may perform control of the room devices in accordance with the hotel control instructions. In some embodiments, the hotel management system 110 may generate corresponding control instructions according to the personalized requirements provided by the user when the room is reserved (e.g., the user's favorite temperature, humidity, lighting, and curtain opening or closing, etc.), and transmit the corresponding control instructions to the control panel 201. The control panel 201 may control the corresponding room devices in the room and adjust the environment in the room. In some embodiments, hotel management system 110 may execute hotel consumption mode. After the user successfully uses the control panel 201 to complete the unlocking of the room door and enters the room, the server 210 may receive the user's consumption data statistics in real time and generate a consumption record. After receiving the user's check-out settlement instruction, the server 210 may send the settled consumption information to the user's remote terminal 140 for confirmation by the user. After the user confirms, the user's consumption record may be generated and stored.

In step 750, the hotel management system 110 may execute a user operation instruction. In some embodiments, the user may log in to the control panel 201 directly or using the remote terminal 140 through the network or log in to the hotel management system 110 using the remote terminal 140 through the network to perform the hotel consumption mode, the smart lighting mode, the temperature and humidity control mode.

In step 750, the hotel environment control system may be turned on after the user opens the door and enters the room. In some embodiments, the hotel management subunit 411 may control the room environment. In step 750, the hotel management subunit 411 may push the services to the room and control the room environment according to the customized information sent by the user. For example, the environment information of the room may be promptly pushed to the user, and the user may observe the various parameter information detected by the sensor of the room in real time. For another example, the user may input the desired hotel room management service on the touch panel of the control panel 201, and send it to the server 210. The server 210 may inform the hotel manager perform services according to the user's needs at any time. For example, if the humidity displayed too low in the room on the control panel 201, humidification is needed. After the server receives this instruction, the hotel manager may directly control the humidity of the room through the workstation.

In step 750, the user may also control the room environment. In some embodiments, the user operation subunit 412 may control the room environment. In some embodiments, the remote terminal 140 may be connected to the user operation subunit 412 through the network 140. The remote terminal 140 may execute a hotel consumption mode, a smart lighting mode, a temperature and humidity control mode, and the like. It should be noted that the above examples are only for understanding and practical applications are not limited thereto. Those skilled in the technical field may completely perform other deformations or applications in understanding the principle. For example, combining this function with other functions may accomplish more complex tasks.

In step 760, the environment control module 330 may generate a third authorization key. In some embodiments, the user may issue a third authorization key to a third party service, and a third party may use the third authorization key to enter the room. For example, the user may issue a third authorization key to the hotel to clean the staff so that the staff may enter the room. For example, a user may issue a third authorization key to a third person who has permission to enter the room, and a third person may use the third authorization key to enter the room.

In step 770, the hotel management system 110 may monitor the entire process of the environmental control system. In some embodiments, the server 210 may analyze the stored data and convert it into corresponding real-time monitoring information and monitor in real-time one or more combinations of operating conditions of environment control system, user's operation instructions, and hotel manager's operation instructions. Further, the user may use the control panel 201 or use the remote terminal 140 to log in to the control panel 201 to check the monitoring information in real time. Further, the hotel manager may use the workstation 202 to check the monitoring information in real time. In some embodiments, hotel management system 110 may store related environment control operations and instructions. In some embodiments, the server 210 is used to store user's data information, keys (i.e., the first authorization key, the second authorization key, the third authorization key) and working logs. In some embodiments, the server 210 may receive the user information and send the user information to the server 210 for backup through the network. The server 210 may receive, send, and process a room environment control request created by a hotel manager and send the user information to the server 210 for backup via the network. The server 210 may receive the environment control request input by the user in the control panel 201, and send the environment control request in the control panel 201 to the backup in the memory 360 through the network. In some embodiments, server 210 may stop the hotel environment control system. In some embodiments, the user may execute the check-out instruction through the control panel 201. The hotel manager may stop the sensing unit 430 from continuing to collect information according to the check-out instruction. The server 210 may also stop monitoring the entire room environment.

In step 770, the user operation subunit 412 may implement check-out management. After the user successfully uses the control panel 201 to complete the unlocking of the room door and enters the room, the server 210 may receive the user's consumption data statistics in real time and generate a consumption record. After the server 210 receives the user's check-out settlement instruction, the server 210 may send the settled consumption information to the remote terminal 140 for confirmation by the user. After the user confirms, the user's consumption record is generated and stored. In some embodiments, the check-out settlement instruction may be that the user closes the room, that the room is in the closed state according to the door magnet, and that the user sends the check-out instruction to the server 210 through the remote terminal 140. In some embodiments, the hotel management subunit 411 may stop the room environment control system and may display the received user's consumption records and payment results through the control panel 201.

In some embodiments, the action that the user may place the key in the key capsule may be treat as check-out instruction to end the hotel management. The control panel 201 may receive the reset information of the magnetic induction to the key, and send the check-out instruction to the server 210. The control panel 201 may end hotel management. All operations of the hotel management subunit 411 and the user operation subunit 412 may be cleared.

In step 770, the server 210 ends the hotel management. In some embodiments, the server 210 may stop the sensor module 120 from continuing to collect information and may also stop monitoring the entire room environment. And all operations of the hotel management subunit 411 and the user operation sub4unit 312 may be cleared.

Figure 8:
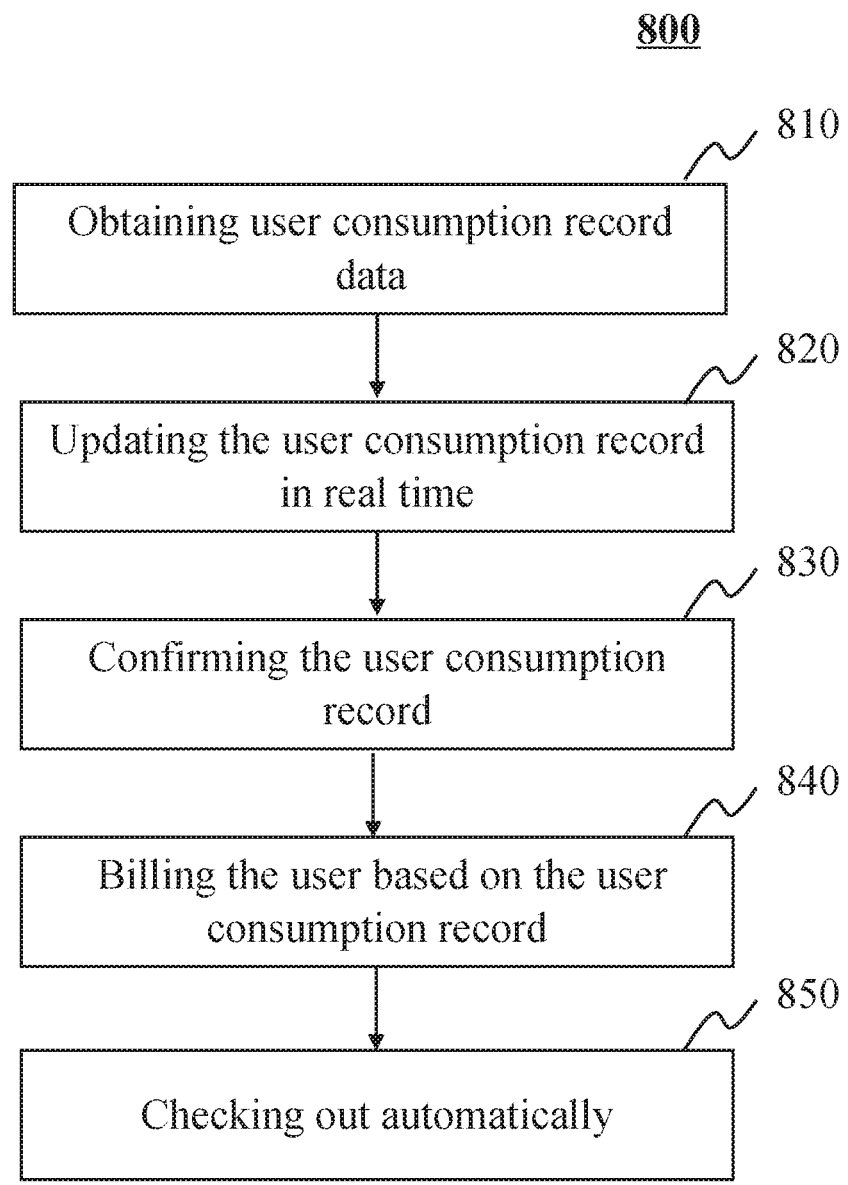
FIG. 8 is a schematic diagram illustrate an exemplary consumption process according to some embodiments of the present disclosure.

FIG. 8 is a schematic diagram illustrate an exemplary consumption process according to some embodiments of the present disclosure. In some embodiments, the consumption check-out process may further include obtaining user consumption record data 810, updating user consumption record in real time 820, confirming user consumption record 830, deducting consumption fee 840, and checking out automatically 850.

In step 810, the consumption record statistics unit 510 may obtain user consumption record data and generate a consumption record. In some embodiments, sensors may installed at near a seal of a commodity for sale in the room of the hotel. If the user open the seal, the sensor will be triggered and the billing module 340 system will automatically generate a consumption record related to the commodity and determine a price of the commodity. The consumption record statistics unit 510 may automatically transmit the consumption activity time, commodity quantity and item code to the hotel management system 110 through the network when the user buys or consumes the commodity.

In step 820, the consumption record statistics unit 520 may update the user consumption record in real time. Once the sensor detects that the user has open the seal, the consumption record confirming unit 520 may upload the user's consumption record to the hotel management system 110 in real time via the network, and store the consumption record.

In step 830, the consumption record confirmation unit 530 may confirm the user consumption record. After the user checks the consumption record and confirms that the consumption record, he or she may click the interface button or enter text to confirm. The consumption record may include one or a combination of the user's consumption location (i.e., room number), consumption code, consumption time, name of the consumption item, quantity of consumption item, consumption cost, whether to invoke, invoice header, preferential status, and the like.

In step 840, the automatic charge unit 530 may bill the user's based on the user consumption record. In some embodiments, after the billing module 340 receives the user's check-out settlement instruction, the automatic charge unit 530 may bill the user based on the user consumption record. The check-out settlement instruction may be a check-out instruction sent by the user. The method for transmitting the check-out instruction may perform data transmission via a network cable or wireless communication technology. The data of the check-out application information may include at least one or more combinations of room number, check-out time, consumption data, or the like, or any combination thereof.

In step 850, the hotel management subunit 411 may stop the room environment control system, and may display the received user's consumption record and payment result through the control panel 201. The hotel management system 110 may initiate a transaction request to the bank transaction system, deducting the actual consumption cost of the user. After the transaction is completed, the hotel self-service terminal device may display the transaction result to the user.

FIG. 9-A is an exemplary schematic diagram illustrating an exemplary structure of the control panel 201. The control panel 201 may include a first sub-panel 910, a second sub-panel 916, and a shielding plate 915. In some embodiments, the shielding plate 915 may be located between the first sub-panel 910 and the second sub-panel 916. In some embodiments, the control panel 201 may be installed on the room door 922. The control panel 201 may be used to control the pop-in and pop-out of the spring bolt 920, and implement opening and locking of the room door 922. The door magnet 921 may be used to determine the on/off state of the door. The illustrated control panel 201 may be mounted on a room door, deployed here as an embodiment. The installation location may not be limited.

In some embodiments, the control panel 201 is mounted on the room door 922 and may be connected via a port. The types of wired port include but are not limited to UART (Universal Asynchronous Receiver/Transmitter), I2C (Inter-Integrated Circuit), SPI (Serial Peripheral interface), etc. The type of the port may be customized, and may include, and without limitation to, customizing the numbers and functions of the port pin. Functions of the port pin may include, and without limitation to, power supply, hardware connection handshaking or communication, etc. The types of wireless port may include but are not limited to Bluetooth or Wi-Fi. The description about the interface may not be limited to the above situations, and those skilled in the art may make other modifications according to the use characteristics of the interface. It should be noted that the disclosure of ports is not limited to the situations mentioned above. A person of ordinary skill in the art may modify a port according to its specific features.

The first sub-panel 910 and the second sub-panel 916 may be connected in a detachable manner. Technique used to achieve the detachable connection may include but not limited to one or more of magnetic connections, pin connection, elastic deformation connection, buckle connection or plug-in connection, etc., and may be any technique that may connected two independent panels in a detachable way, such as expansion bolt or data port. The second sub-panel 916 may be placed on a wall or any other appropriate position, and the first sub-panel 910 may be installed to or buckled on the second sub-panel 916. When the first sub-panel 910 is detached, at least a portion of the second sub-panel 916 may be covered to avoid the exposure of the second sub panel 916 directly.

In some embodiments, the exterior of the first sub-panel 910 may include a camera 911. The camera 911 may collect video and/or audio, and images of the video could be static or dynamic. The camera 911 may be configured to perform face recognition, gesture recognition, voice recognition, or the like, or any combination thereof. In some embodiments, the exterior of the first sub-panel 910 may include but not limited to a touch screen 912, a key 913, and a button 914. The touch screen 912 may have both input and output functions, and is the operation interface for a user to use the control system environment. Types of inputted and outputted information may include but not limited to number, analog quantity, character symbol, voice, graphic image, etc. The type of the touch screen 1513 may be chosen according to a user's specific need, and may include but not limited to resistive touch screen, capacitive touch screen, infrared touch screen, surface acoustic wave touch screen, etc. It should be noted that it is possible but is not required to install the input/output module on the first sub-panel 910. Other technology may be used to realize the input/output function. In some embodiments, the key 913 may be an electronic door lock. Specifically, after receiving the user request sent by the remote terminal 140, the key 913 may be matched according to the processing of the server 210. The key 913 may receive the first authorization key sent by the server 210, and the control panel 201 controls the room door to automatically unlock. In some embodiments, the user may also manually turn on the key 913 using a key. The touch screen 912 may perform both input and output functions and may be an operation interface to use the environment control system for the user. The input and output information types may include, but are not limited to, digital, analog, text symbols, voice, and graphic images, or the like, or any combination thereof. The type of the touch screen 912 may be chosen according to a user's specific need, and may include but not limited to a resistive touch screen, a capacitive touch screen, an infrared touch screen, a surface acoustic wave touch screen, or the like, or any combination thereof. It should be noted that it is possible but is not required to install the input/output module on the first sub-panel 910. Other technology may be used to realize the input/output function. For example, the touch screen 912 on the first sub-panel 910 may be replaced by one or more devices with input and/or output function. When a single device is used, it may include but is not limited to a cellular phone, a PDA, a tablet computer, a touch screen television, a wearable smart device (such as glasses, gloves, bracelet, watch, clothes, shoes, etc.), etc. When more than one devices are used, they may include but are not limited to a computer (desktop computer, laptop computer, etc.) with a keyboard (or mouse), a television (flat-panel television, cathode ray tube television, rear-projection television, three-dimension television, etc.) with a remote controller (or cellphone), etc. These devices may be used alone or in combination to achieve the input and output of data. For example, if a remote controller are used instead of the touch screen 912, the data interface may be displayed on the television and the remote controller may be used to input and output the data. The button 914 may be used as a shortcut key (e.g., a function shortcut key, a return shortcut key, or a menu shortcut key, etc.).

The side of the second sub-panel 916 that is closer to the first sub-panel 910 (when installed or used according to design) may include one or more physical controller 918. A physical controller may be a physical switch that has the on and off mode. A physical controller 918 may control the on and off of devices, such as light air-conditioner, heat, and similar devices, etc. A physical controller 918 may control current load of a device between on status and off status. For example, a physical controller 918 may be a physical dimmer, which may be used by the user to modify luminance of a light manually. A physical controller 918 may also be a physical temperature controller, which may be used by the user to modify temperature of air-conditioner and/or heat manually. The number of physical controllers 918 is based on the specific need of a user, such as one, two, three or more. If the second sub-panel 916 contains multiple physical controllers, in some embodiments, at least two of these physical controllers may achieve similar functions. For example, at least two of these physical controllers may be connected to a lighting power circuit as physical dimmers to control the same light or different lights. At least two of these physical controllers may be connected to the air-conditioner system as physical temperature controller to control the temperature of the same room/region or of different rooms/regions. In some situations, at least two of these physical controllers 918 may control different devices. For example, of these two physical controllers 918, one may be a physical dimmer while the other one may be a physical temperature controller. The second sub-panel 916 further may include a connection port 917 for connecting the first sub-panel 910 and the second sub-panel 916. The connection port 917 may be wired or wireless. The types of wired connection port may include but not limited to UART (Universal Asynchronous Receiver/Transmitter), I2C (Inter-Integrated Circuit), SPI (Serial Peripheral interface), etc. The type of the connection port may be customized, and may include, and without limitation to, customizing the numbers and functions of the port pin. Functions of the port pin may include, and without limitation to, power supply, hardware connection handshaking or communication, etc. The types of wireless connection port may include but are not limited to Bluetooth or Wi-Fi. It should be noted that the structure of the control panel 201 described in FIG. 9-A is not limited to the modules or parts shown in the figures. To achieve the same or a similar function, a person of ordinary skill in the art may simplify or extend these modules or parts, or add other affiliated modules. For example, the touch screen 912 on the first sub-panel 910 may be used as the input/output interface, or may be replaced by application software installed on the user terminal (such as cellphone, computer, tablet PC, PDA or television, etc.), or communication of the environment control system. For another example, an affiliated module may be installed on the first sub-panel 910 or the second sub-panel 916. The affiliated module may include, without limitation to, a LED breath light. Functions of the LED breath light may include for example hinting positions and/or status of buttons of the smart switch or physical controller, thus helping the user find operation keys more quickly, reflecting power status of the smart switch, reminding unread message, etc. The breath light may help the user interact with the environment control system in dim light (such as cloudy days or nights). Many similar variations are still within the scope sought by the present application, for example, the first sub-panel 910 or the second sub-panel 916 may be equipped with at least one background light.

In some embodiments, the key 913 may include a mechanical door lock and may be located on the first sub-panel 910. The second sub-panel 916 may also include a key capsule 919 as shown in FIG. 9. The key capsule 919 may be used to place a key. Specifically, the key 913 may receive the unlocking instruction sent by the remote terminal 140. According to the matching of the server 210, the key receives the unlocking instruction sent by the server 210. The control panel 201 may control the key capsule 919 to pop up the key. The user may unlock using the room key. In some embodiments, the key capsule 919 may be located outside the second sub-panel 916. When the key capsule 919 is located outside the second sub panel 916, the user may open the key capsule 919 through the first sub panel. The user may also open the key capsule through a user terminal (e.g., mobile phone, computer, tablet, PDA, TV, etc.).

The door magnet 921 is used to detect whether the door, window, drawer, and the like are opened or moved. The door magnet 921 is installed on the door of the room. The door magnet 921 may be composed of a wireless transmitter and a magnetic force sensor that may be used to determine the state of the room door 920.

FIG. 9-B is a schematic diagram illustrating an exemplary structure of the side of the second sub-panel 916, which is far away from the first sub-panel 910 (when installed or used according to design). The structure of include the second sub-panel 916, a key capsule 919, a fixation device 924, a power dimmer module 925, and the power line 923. The second sub-panel 916 may connect to the panel fixation device 924. The power line 923 may extend from the bottom of the power dimmer module 925 or from other parts of the power dimmer module 925. The external junction box may match the number of the physical controllers 918, and may be in compliance with a universal standard, such as the UL 514A, UL 514B, UL 514C, UL 514D series standards of the Underwriter Laboratories Inc. (UL), and other standards based on the user's practical application situation. The second sub-panel 916 may be connected to an existing power circuit to control the existing power circuit without setting up new power circuit for the environment control system. For example, the second sub-panel 916 may be connected to an existing lighting control circuit to achieve the control of the lighting control system. The second sub-panel 916 may also be connected to an existing temperature (air-conditioner or heat) control circuit to achieve the control of the temperature (air-conditioner or heat) control system. The environment control system may also control other devices (such as home appliances, automobile, etc.). The second sub-panel 916 of the control panel 201 may be connected to the key capsule 919 configuration. The control panel 201 may control the key capsule 919 to pop up the key. After the key capsule pops up the key, the user may use the room key to unlock the door. In some embodiments, the user may use the control panel 201 to complete the unlocking of the room door and then check in successfully.

It should be noted that the structure of the control panel 201 described in FIG. 9-A and FIG. 9-B are not limited to the modules or parts shown in the figures. To achieve the same or a similar function, a person of ordinary skill in the art may simplify or extend these modules or parts, or add other affiliated modules. For example, the touch screen 912 on the first sub-panel 910 may be used as the input/output interface, or may be replaced by application software installed on the user terminal (such as cellphone, computer, tablet PC, PDA or television, etc.), or communication of the environment control system. For another example, an affiliated module may be installed on the first sub-panel 910 or the second sub-panel 916. The affiliated module may include, without limitation, a LED breath light. Functions of the LED breath light may include for example hinting positions and/or status of buttons of the smart switch or physical controller, thus helping the user find operation keys more quickly, reflecting power status of the smart switch, reminding unread message, etc. The breath light may help the user interact with the environment control system in dim light (such as cloudy days or nights). Many similar variations are still within the scope sought by the present application, for example, the first sub-panel 910 or the second sub-panel 916 may be equipped with at least one background light.

FIG. 9-C is a schematic diagram illustrating an exemplary control panel 201 in the environmental control system. The control panel 201 may include a power dimmer module 946, a third sub-panel 942, and the like. The power dimmer module 946 may be connected to the AC power source 941 thereof. The third sub-panel 942 may include, but is not limited to, a key 944, a switch or dimmer 945, an imaging device 943, and other components. The key 944 may be an electronic door lock. Specifically, after the key 944 may receive the unlocking instruction sent by the remote terminal 140. According to the matching of the server 210, the key 944 may receive the unlocking instruction sent by the server 210, and the control panel 201 may control the room door to automatically unlock. Key 944 may be an electronic door lock.

The physical controller 945 may be a physical dimmer, which may be used by the user to modify luminance of a light manually. A physical controller 945 may also be a physical temperature controller, which may be used by the user to modify temperature of air-conditioner and/or heat manually. The number of physical controllers 945 is based on the specific need of a user, such as one, two, three or more. If the control panel 201 contains multiple physical controllers, in some embodiments, at least two of these physical controllers may achieve similar functions. For example, at least two of these physical controllers may be connected to a lighting power circuit as physical dimmers to control the same light or different lights. At least two of these physical controllers may be connected to the air-conditioner system as physical temperature controller to control the temperature of the same room/region or of different rooms/regions. In some situations, at least two of these physical controllers 945 may control different devices. For example, of these two physical controllers 945, one may be a physical dimmer while the other one may be a physical temperature controller.

Other components or modules in the control panel 201 may include, and without limitation to, a microphone 948, a speaker/buzzer 949, a processor 950, a network module 951, a network device 952, a sensor 953, a power module 954, etc. It should be noted that the above structure may be just an embodiment proposed. It should be noted that the structures described above are only one exemplary embodiment provided for a better understanding of the control panel, and do not include all the possible types of the control panel. Scope of disclosure of the control panel in this application still includes any simplification of the control panel according to practical needs, and a person of ordinary skill in the art may make other modifications according to the described mechanisms of the control panel. Such modifications may include, and without limitation, to adding new components (such as adding input device or output device, etc.), omitting some components (such as omitting camera device or microphone, etc.), etc., and they are still within the scope sought by the present application. For example, the third sub-panel 947 may also further include a structure similar to the port 935 on the second sub-panel 916. Via this port, the control panel 201 may be connected with the first subpanel 910. This connection may realize data or information communication between the first sub-panel 910 and the control panel 201. The port 935 may also provide mechanical support for the connection between the first sub panel 910 and the control panel 201. The connection between the first sub-panel 910 and the control panel 201 may be a detachable connection, which is similar to the detachable connection between the first panel 910 and the second sub-panel 916 according to the present disclosure.

According to the present disclosure, the control panel 201 may be or include a smart controller. Compared with physical controllers, the smart controller may control a device controllable by the physical controllers. For example, the control panel or smart controller may exert control over the device via a physical switch or physical controller. For example, the control panel or the smart controller may implement control of the device through physical switches or physical controllers. As another example, the control panel or the smart controller may control the device via other methods. The control panel or the smart controller may also control other devices than this device and/or have other functions than controlling the device (e.g., hotel environment control as illustrated in the present disclosure). For example, the control panel 201 may be equipped with a sensing module capable of collecting one or more parameters. For another example, the control panel 201 may be equipped with a touch screen that is able to receive user input and/or display information to the user. The control panel 201 may also have other structures and/or other functions described in the present disclosure.

Those skilled in the art will understand that the disclosure of the present application can be a variety of variations and modifications. For example, although the implementation of various components described above may be embodied in a hardware device, it may also be implemented as a software-only solution—e.g., an installation on an existing server or mobile device. In addition, the location information disclosed herein may be provided through a firmware, a combination of firmware/software, a combination of firmware/hardware, or a combination of hardware/firmware/software.

The above describes the present application and/or some other examples. According to the above, this application can also make different modifications. The subject matter disclosed in this application can be implemented in different forms and examples, and this application can be applied to a large number of applications. All applications, modifications and changes claimed in the following claims are within the scope of this application.

We claim:

1. A system comprising:
   at least one control panel which includes a first sub-panel and a second sub-panel, wherein:
   the at least one control panel is installed at any place where a user needs to implement authentication;
   the at least one control panel is used to
   learn behavior habit data of the user according to historical consumption records of the user,
   control environment in a room according to the behavior habit data,
   push environment information of the room to the user in real time,
   be logged in to check monitoring information of an entire process of an environmental control system,
   generate a third-party authorization key. wherein the third-party authorization key can be issued by the user to a third party service and the third-party authorization key includes a third-party room check-in management,
   generate a check-out instruction when the user places a key in a key capsule, and
   implement a hotel consumption mode. wherein at least one sensor is installed near a seal of a commodity of the room. and if the seal is opened. the sensor is triggered and the price of the commodity is automatically calculated;
   the first sub-panel is used to verify a first authorization key;
   the first authorization key is used for hotel identity verification;
   the first authorization key includes at least one of room check-in management, push service, control of room environment, and room check-out management;
   the second sub-panel works independently of the first sub-panel, and the second sub-panel further includes at least one physical regulator for controlling a sensing module and room equipment;
   the first sub-panel is configured to control the at least one physical regulator and the first sub-panel and the second sub-panel are detachably connected.

2. The system of claim 1, wherein the first sub-panel further includes a second authorization key, and the second authorization key includes at least one of room check-in management, push service, control of room environment, and room check-out management.

3. The system of claim 1, wherein the control panel further includes the key capsule for keeping the key, and the key is used to unlock a room.

4. The system of claim 3, wherein the key capsule is installed in the second sub-panel or independently installed outside the second panel.

5. The system of claim 1, wherein the physical regulator further includes a physical dimmer.

6. The system of claim 1, wherein the physical regulator further comprises a physical thermostat.

7. A method comprising:
   learning behavior habit data of a user according to historical consumption records of the user by at least one control panel, wherein the at least one control panel includes a first sub-panel and a second sub-panel and is installed at any place where a user needs to implement authentication;
   controlling environment in a room according to the behavior habit data;
   pushing environment information of the room to the user in real time;
   checking monitoring information of an entire process of an environmental control system;
   generating a third-party authorization key, wherein the third-party authorization key can be issued by the user to a third party service and the third-party authorization key includes a third-party room check-in management;
   generating a check-out instruction when the user places a key in a key capsule;
   implementing a hotel consumption mode, wherein at least one sensor is installed near a seal of a commodity of the room, and if the seal is opened, the sensor is triggered and the price of the commodity is automatically calculated;

verifying a first authorization key through the first sub-panel wherein the first authorization key is used for hotel identity verification, and the first authorization key includes at least one of room check-in management, push service, control of room environment, and room check-out management;

detecting room environment changes and managing keys through the first subpanel; and controlling room equipment based on the room environment changes through the second sub-panel, wherein:

the second sub-panel is configured to work independently of the first sub-panel;

the second sub-panel includes at least one physical regulator for controlling room equipment;

the first sub-panel is configured to control the at least one physical regulator; and the first sub-panel and the second sub-panel are detachably connected.

8. The method of claim 7, wherein the first sub-panel further includes a second authorization key, and the second authorization key includes room check-in management, push service, control of the room environment, and room check-out management.

9. The method of claim 7, wherein the control panel further includes the a key capsule for keeping the key, and the key is used to unlock a room.

10. The method according to claim 9, wherein the key capsule is installed in the second sub-panel or independently installed outside the second panel.

11. The method of claim 9, wherein the physical regulator further includes a physical dimmer.

12. The method of claim 9, wherein the physical regulator further includes a physical thermostat.

\* \* \* \* \*